US012121487B2

(12) United States Patent
Schmidt et al.

(10) Patent No.: US 12,121,487 B2
(45) Date of Patent: Oct. 22, 2024

(54) CARRIABLE COMPLEX REHABILTATION TECHNOLOGY SYSTEMS

(71) Applicant: ALTIMATE MEDICAL HOLDINGS, INC., Morton, MN (US)

(72) Inventors: Jeffrey Schmidt, Redwood Falls, MN (US); Matt Haugen, Hector, MN (US); Mark Schmitt, Atwater, MN (US); Wesley Ovre, Redwood Falls, MN (US)

(73) Assignee: ALTIMATE MEDICAL HOLDINGS, INC., Morton, MN (US)

( * ) Notice: Subject to any disclaimer, the term of this patent is extended or adjusted under 35 U.S.C. 154(b) by 0 days.

(21) Appl. No.: 18/247,713

(22) PCT Filed: Oct. 5, 2021

(86) PCT No.: PCT/US2021/053571
§ 371 (c)(1),
(2) Date: Apr. 3, 2023

(87) PCT Pub. No.: WO2022/076411
PCT Pub. Date: Apr. 14, 2022

(65) Prior Publication Data

US 2023/0414436 A1 Dec. 28, 2023

Related U.S. Application Data

(63) Continuation of application No. 17/062,712, filed on Oct. 5, 2020, now Pat. No. 12,016,814.

(51) Int. Cl.
*A61H 1/02* (2006.01)

(52) U.S. Cl.
CPC ... *A61H 1/0229* (2013.01); *A61H 2001/0233* (2013.01); *A61H 2201/0119* (2013.01);
(Continued)

(58) Field of Classification Search
CPC .......... A61H 1/0229; A61H 2001/0233; A61H 2201/0119; A61H 2201/0157;
(Continued)

(56) References Cited

U.S. PATENT DOCUMENTS 339,650 A * 4/1886 Hill .................... A63B 69/0064 482/69
1,703,375 A * 2/1929 Volk ..................... A63B 21/156 473/216

(Continued)

FOREIGN PATENT DOCUMENTS

SE 532606 C2 3/2010

OTHER PUBLICATIONS

International Search Report and Written Opinion for International Application No. PCT/US2021/053571, dated Apr. 12, 2022, 20 pgs.

*Primary Examiner* — Garrett K Atkinson
(74) *Attorney, Agent, or Firm* — Fredrikson & Byron, P.A.

(57) ABSTRACT

A complex rehabilitation technology system includes a frame and a complex rehabilitation technology device. This frame is movable between a collapsed carriable position and an expanded support position to facilitate portability or storage. The complex rehabilitation technology device is coupled to the frame. And, the complex rehabilitation technology device is configured to be operable when the frame is in the expanded support position. The complex rehabilitation technology system can be portable (e.g., configured for one-handed carrying).

24 Claims, 16 Drawing Sheets

(52) U.S. Cl.
CPC ................ *A61H 2201/0157* (2013.01); *A61H 2201/0161* (2013.01); *A61H 2203/0487* (2013.01)

(58) Field of Classification Search
CPC .... A61H 2201/0161; A61H 2203/0487; A61G 7/1074; A61G 7/10
See application file for complete search history.

(56) References Cited

U.S. PATENT DOCUMENTS 1,924,182 A 8/1933 Fritz
2,812,010 A * 11/1957 Abdallah ............... A61H 3/008 482/69
3,966,202 A 6/1976 Cynamon
4,114,873 A * 9/1978 Jones ................ A63B 69/0022 482/42
4,340,215 A * 7/1982 Murphy ............ A63B 21/4009 16/98
4,651,719 A 3/1987 Funk et al.
4,732,379 A 3/1988 Bodine-Reese et al.
4,744,578 A * 5/1988 Stearns .................... A61G 5/14 280/47.16
4,934,725 A 6/1990 Owens
4,976,623 A * 12/1990 Owsley .................... A63B 1/00 434/247
5,016,300 A 5/1991 Jandrakovic
5,033,460 A * 7/1991 Goldish ............... A61H 1/0218 606/241
D326,437 S 5/1992 Kuhl et al.
D327,041 S 6/1992 Kuhl et al.
D329,833 S 9/1992 Andersson et al.
5,147,265 A * 9/1992 Pauls ..................... A63B 23/12 482/115
5,147,286 A 9/1992 Meals
5,155,789 A 10/1992 Le Noane et al.
5,172,925 A 12/1992 Kendrick et al.
5,176,597 A * 1/1993 Bryne .................... A61H 3/008 482/54
D339,315 S 9/1993 Lindkvist et al.
5,242,180 A 9/1993 Bergeron
D347,604 S * 6/1994 Ernst ............................ D12/132
5,399,138 A 3/1995 Jones
5,403,253 A * 4/1995 Gaylord ............. A63B 69/0064 482/142
5,417,472 A 5/1995 Elvinsson
5,464,383 A 11/1995 Padden et al.
D367,024 S 2/1996 Moeller
5,489,258 A * 2/1996 Wohnsen ............. A61G 7/1051 602/5
5,526,893 A * 6/1996 Higer ....................... A61H 3/04 482/68
D372,890 S 8/1996 Ferm et al.
5,553,855 A 9/1996 Balestrieri
5,569,172 A 10/1996 Padden et al.
5,618,055 A * 4/1997 Mulholland ......... A61G 5/1094 602/5
5,626,540 A * 5/1997 Hall ..................... A61H 1/0229 606/241
5,667,461 A * 9/1997 Hall ................... A63B 69/0064 482/54
5,746,688 A 5/1998 Prager
5,755,649 A 5/1998 Bimby
D399,272 S * 10/1998 Zwonitzer .................... D21/683
5,941,807 A * 8/1999 Cassidy ............. A63B 21/4009 482/130
6,053,519 A * 4/2000 Poindexter ............. A61G 5/042 297/DIG. 10
6,099,447 A * 8/2000 Ramsaroop .......... A63B 21/153 482/127
D448,706 S 10/2001 Ferm
D501,432 S 2/2005 Moller
6,890,288 B2 * 5/2005 Bingham ............. A47D 13/046 482/69
6,941,595 B1 9/2005 Michael
7,036,512 B2 * 5/2006 Harnois ................. A61G 5/128 601/24
7,131,936 B2 * 11/2006 Schlosser ............... A61H 3/008 482/8
7,134,678 B2 11/2006 Lindkvist et al.
7,275,554 B2 * 10/2007 Mullholand ........... A61H 3/008 135/67
7,294,094 B1 * 11/2007 Howle ..................... A61H 3/00 482/69
7,338,418 B2 * 3/2008 Erez ................... A63B 69/0059 482/148
7,341,543 B2 * 3/2008 Dandy .................. A63B 22/20 280/271
D566,409 S 4/2008 Lindqvist et al.
7,354,412 B2 4/2008 Verdonk et al.
7,400,245 B1 7/2008 Johnson
7,404,567 B2 7/2008 Moller
D588,051 S 3/2009 Moller et al.
D598,680 S 8/2009 Birk
D602,405 S 10/2009 Skafdrup et al.
7,651,450 B2 * 1/2010 Wehrell ............. A63B 21/4007 482/129
D609,138 S 2/2010 Skafdrup et al.
7,658,448 B2 2/2010 Birk et al.
7,780,587 B2 * 8/2010 Thornton ................. A61H 3/04 119/770
7,996,935 B1 * 8/2011 Chen ......................... A45F 3/24 5/120
8,007,418 B2 8/2011 LeVert et al.
8,142,379 B2 3/2012 Verdonk et al.
8,186,695 B2 5/2012 Moller
8,186,756 B2 5/2012 Jorgensen
D681,357 S 5/2013 Sjostrand et al.
D681,358 S 5/2013 Sjostrand et al.
D696,162 S 12/2013 Skafdrup et al.
D703,107 S 4/2014 Moller
8,794,252 B2 8/2014 AlSayed et al.
D729,534 S 5/2015 Ferm et al.
D729,535 S 5/2015 Ferm et al.
D729,536 S 5/2015 Ferm et al.
D729,537 S 5/2015 Ferm et al.
D744,909 S * 12/2015 Birk ............................. D12/130
9,239,616 B1 * 1/2016 Carrell .................... G06F 3/011
9,259,603 B2 * 2/2016 Wireman ............. A63B 71/023
9,314,387 B2 4/2016 AlSayed et al.
9,370,680 B1 * 6/2016 Macaulay ............ A63B 71/023
9,452,102 B2 * 9/2016 Ledea ...................... A61H 3/04
9,649,243 B2 5/2017 Johnson et al.
9,657,770 B2 5/2017 Moller
9,662,526 B2 5/2017 Agrawal et al.
9,827,154 B2 * 11/2017 Møller ..................... A61G 5/10
9,931,257 B2 * 4/2018 Lokken ................ A61G 5/1094
10,052,252 B2 * 8/2018 Lin ........................ A61B 5/389
10,179,258 B1 1/2019 Sabbagh
10,220,246 B2 3/2019 Lernihan
10,232,209 B2 * 3/2019 Pouchet ............. A63B 71/0622
10,232,210 B2 3/2019 Pena-Ruiz
10,265,576 B2 4/2019 Kamins
10,272,289 B2 4/2019 Kamins
10,293,206 B2 5/2019 Kamins
10,482,927 B2 * 11/2019 Huang ............... G11B 33/1453
10,576,009 B2 3/2020 Richter et al.
10,639,220 B1 5/2020 Smith
10,709,633 B2 * 7/2020 Kazerooni ............. A61H 3/008
11,083,924 B2 * 8/2021 Borisoff ........... A63B 23/03575
11,166,866 B2 * 11/2021 Ye .................... A63B 21/00181
11,458,061 B1 * 10/2022 Meincke, II ........... B25J 9/0006
2002/0135219 A1 9/2002 Rogers
2003/0176229 A1 9/2003 Jacobys Schutte
2004/0106886 A1 6/2004 Verdonk et al.
2004/0267175 A1 * 12/2004 Harnois ................... A61G 5/14 602/5
2005/0034231 A1 2/2005 Huang
2007/0015641 A1 * 1/2007 Demeniuk ......... A63B 21/4005 482/124
2009/0048549 A1 2/2009 Verdonk et al.
2009/0165203 A1 7/2009 Biersteker et al.

(56) References Cited

U.S. PATENT DOCUMENTS

| | | | | |
|---|---|---|---|---|
| 2010/0292053 | A1 | 11/2010 | LeVert et al. | |
| 2011/0024374 | A1 | 2/2011 | Brown et al. | |
| 2013/0263374 | A1 | 10/2013 | Yamaguchi et al. | |
| 2014/0261363 | A1 | 9/2014 | Lu | |
| 2014/0302971 | A1 | 10/2014 | Vining, III | |
| 2015/0035978 | A1 | 2/2015 | Johnston | |
| 2016/0008195 | A1 | 1/2016 | Lokken et al. | |
| 2016/0236032 | A1 | 8/2016 | Kamins | |
| 2016/0296784 | A1* | 10/2016 | Kamins ................ | A63B 21/154 |
| 2016/0296785 | A1 | 10/2016 | Kamins | |
| 2018/0264316 | A1 | 9/2018 | Liu | |
| 2019/0030412 | A1 | 1/2019 | Benet | |
| 2019/0176008 | A1 | 6/2019 | Antelme et al. | |

* cited by examiner

CARRIABLE COMPLEX REHABILTATION TECHNOLOGY SYSTEMS

RELATED APPLICATIONS

This application is a 35 U.S.C. 371 national stage filing from International Application No. PCT/US2021/053571, filed Oct. 5, 2021, which claims the benefit of U.S. patent application Ser. No. 17/062,712 filed Oct. 5, 2020. The contents of both of these applications are incorporated herein by reference.

TECHNICAL FIELD

This disclosure relates generally to carriable complex rehabilitation technology systems. Some such system embodiments include a complex rehabilitation technology device along with one or more features that can facilitate portability of that particular complex rehabilitation technology device.

BACKGROUND

Complex rehabilitation technology devices provide people with a disability or handicap with many health and social benefits. For example, one complex rehabilitation technology device is a stander. A stander can provide the benefits of standing to a disabled or handicap person not able to do so on his or her own. The health benefits on standing are well documented. Even where there is little, or no, control over the muscle groups that normally support a person in a standing posture, the standing posture itself can improve blood flow, increase bone density, improve flexibility and range of motion, and improve the person's sense of well-being by simply allowing that person to stand. Other types of complex rehabilitation technology devices are designed to assist other specific medical and functional needs of an individual living with a disability or handicap.

However, many complex rehabilitation technology devices define a large footprint that is not easily reduced due, at least in part, to the relatively large number of interconnected parts. This can make portability of such complex rehabilitation technology devices problematic and, in many cases, prohibitive. Despite the well documented health and social benefits, because such complex rehabilitation technology devices can be difficult to transport from one location to another this may reduce utilization and increase costs associated with complex rehabilitation technology devices.

SUMMARY

This disclosure in general provides embodiments relating to carriable complex rehabilitation technology systems. Such system embodiments can include a complex rehabilitation technology device along with one or more features that can facilitate portability of that particular complex rehabilitation technology device. As one example, some complex rehabilitation technology system embodiments disclosed herein can be selectively brought into a collapsed carriable position, having a relatively more compact footprint, that facilitates transportation of the complex rehabilitation technology device from one location to another. Accordingly, embodiments disclosed herein can provide various complex rehabilitation technology devices with increased portability and thereby increase utilization of complex rehabilitation technology devices.

One embodiment includes a complex rehabilitation technology system. This complex rehabilitation technology system embodiment includes a frame and a complex rehabilitation technology device. The frame is movable between a collapsed carriable position and an expanded support position. The complex rehabilitation technology device is coupled to the frame. And, the complex rehabilitation technology device is configured to be operable when the frame is in the expanded support position.

In a further embodiment of this complex rehabilitation technology system, the frame includes a tripod. The tripod includes a tripod base, a first leg, a second leg, and a third leg. The complex rehabilitation technology device is coupled to the tripod base. Each of the first leg, the second leg, and the third leg is hingedly attached to the tripod base. In this embodiment, at least two of the first leg, the second leg, and the third leg can be movable relative to the tripod base between the collapsed carriable position and the expanded support position. Also in this embodiment, the first leg, the second leg, and the third leg can be spaced further apart when in the expanded support position than when in the collapsed carriable position.

As one example, the complex rehabilitation technology device, of the complex rehabilitation technology system embodiments above, can be a stander. The stander can include a stander base, a trunk support, a first leg support and a second leg support, a first knee support and a second knee support, and a first foot support and a second foot support. The stander base can be coupled to the frame. The trunk support can be coupled to the stander base. The first leg support and the second leg support can each be coupled to the stander base. The first knee support and the first foot support can each be coupled to the first leg support. The second knee support and the second foot support can each be coupled to the second leg support.

Another embodiment includes a portable stander system. This portable stander system embodiment includes a frame and a stander device that is coupled to the frame. The frame includes a handle. The portable stander system is configured for one-handed carrying via the handle.

In a further embodiment of this portable stander system, the frame can be movable between a collapsed carriable position and an expanded support position. The stander device can be configured for one-handed carrying via the handle when the frame is in the collapsed carriable position. And, the stander device can be configured to be operable when the frame is in the expanded support position.

Another embodiment of a portable stander system includes a frame and a stander device that is coupled to the frame. The frame is collapsible to fit the portable stander system within an interior volume of a package of 100 liters.

The details of one or more examples are set forth in the accompanying drawings and the description below. Other features, objects, and advantages will be apparent from the description and drawings, and from the claims.

BRIEF DESCRIPTION OF DRAWINGS

The following drawings are illustrative of particular examples of the present invention and, therefore, do not limit the scope of the invention. The drawings are not necessarily to scale and are intended for use in conjunction with the explanations in the following detailed description. Examples of the present invention will hereinafter be described in conjunction with the appended drawings.

FIG. 1 shows a frame of the complex rehabilitation technology system in an expanded support position.

FIG. 7 shows the frame embodiment in an expanded support position, and FIG. 8 shows the frame embodiment in a collapsed carriable position.

DETAILED DESCRIPTION

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Figure 1:
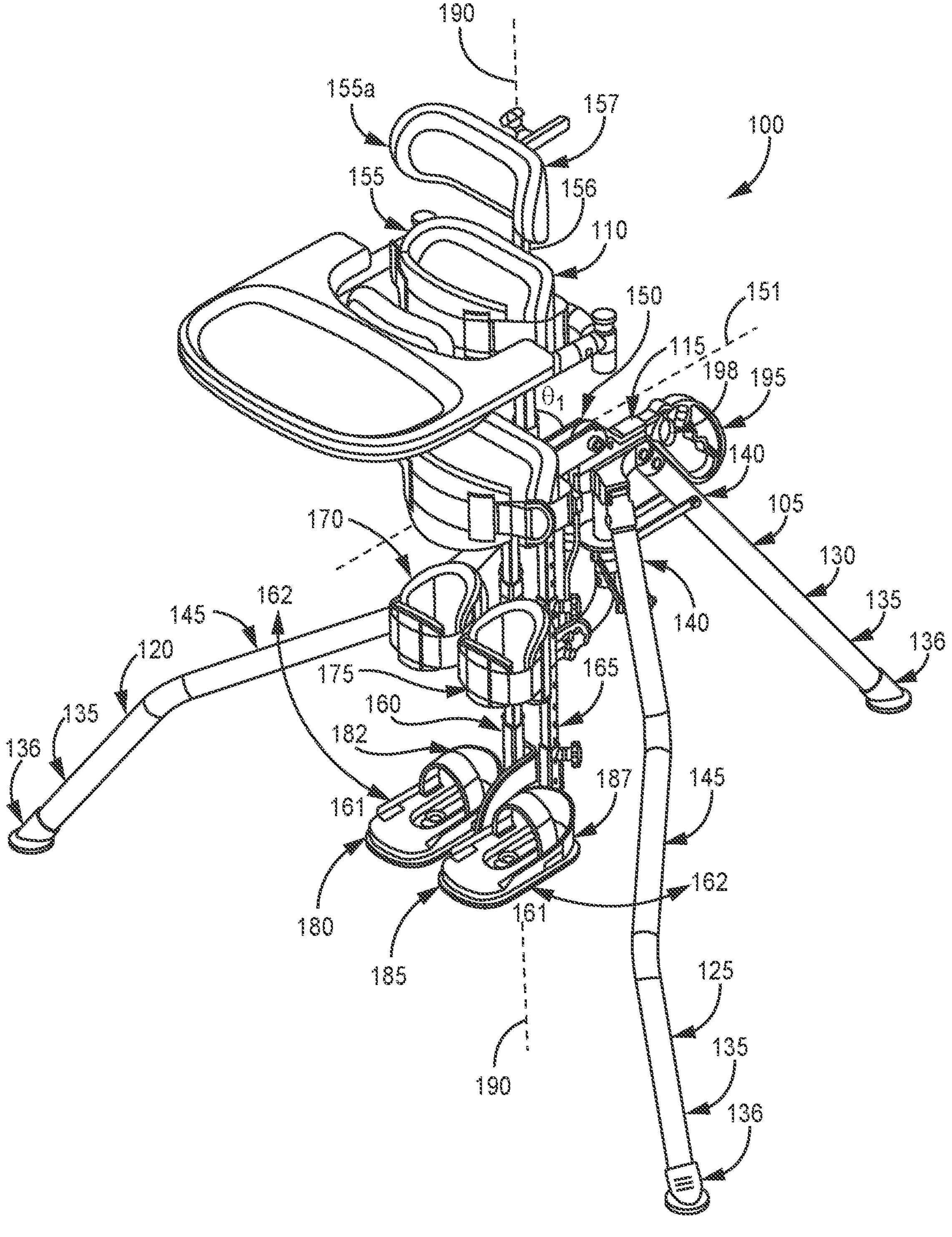
FIG. 1 is a perspective view of an embodiment of a complex rehabilitation technology system.
Figure 4:
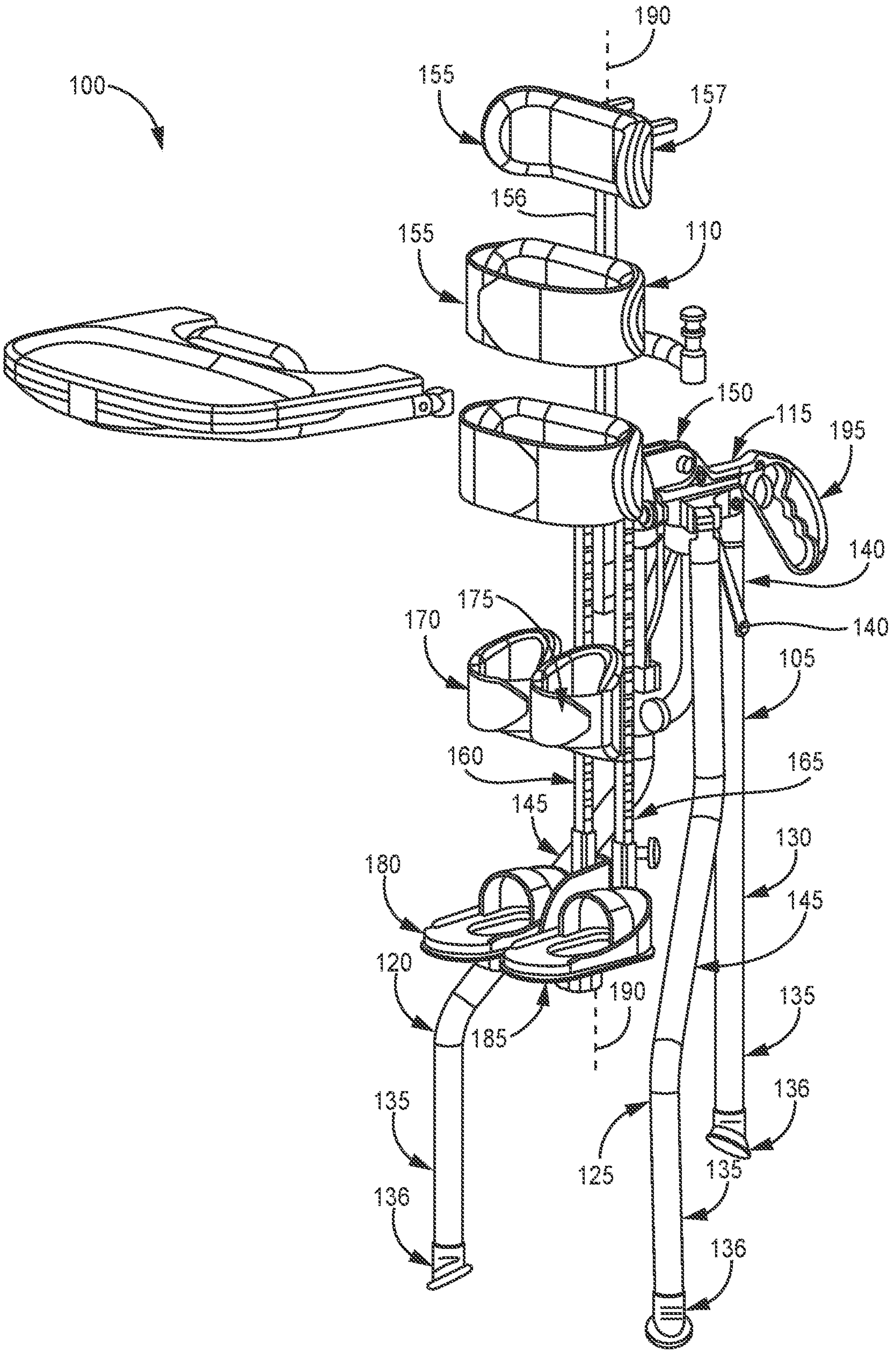
FIG. 4 is a perspective view of the complex rehabilitation technology system of FIG. 1 but with the frame in a collapsed carriable position.

FIG. 1 illustrates an embodiment of a complex rehabilitation technology system 100. The complex rehabilitation technology system 100 can include a frame 105 and a complex rehabilitation technology device 110. The frame 105 can be movable between a collapsed carriable position and an expanded support position. FIG. 1 shows the frame 105 in an exemplary expanded support position (FIG. 4 shows the frame 105 in an exemplary collapsed carriable position). The complex rehabilitation technology device 110 can be coupled to the frame 105. And, the complex rehabilitation technology device 110 can be operable when the frame 105 is in the expanded support position, for instance as shown in FIG. 1.

The illustrated exemplary embodiment of the frame 105 forms a tripod that includes a tripod base 115, a first leg 120, a second leg 125, and a third leg 130. The complex rehabilitation technology device 110 is coupled to the tripod base 115. One or more of the first leg 120, the second leg 125, and the third leg 130 can be hingedly attached to the tripod base 115 such that the one or more hingedly attached legs can move relative to the tripod base 115. For example, in the illustrated embodiment of the frame 105 each of the first leg 120, the second leg 125, and the third leg 130 are hingedly attached to the tripod base 115.

Each of the first leg 120, the second leg 125, and the third leg 130 can include a lower end portion 135 and an upper end portion 140 that is opposite the lower end portion 135. The upper end portion 140 of each leg 120, 125, 130 can be attached to the tripod base 115. Namely, in the illustrated embodiment, the upper end portion 140 of each of the first leg 120, the second leg 125, and the third leg 130 is hingedly attached to the tripod base 115 via a hinged connection point at the upper end portion 140. The lower end portion 135 of each leg 120, 125, 130 can include a foot 136 that is configured to support the complex rehabilitation technology system 100 at a support surface (e.g., a ground surface), for instance when the frame 105 is in the expanded support position. As shown in FIG. 1, the lower end portion 135 of the first leg 120, the lower end portion 135 of the second leg 125, and the lower end portion 135 of the third leg 130 can form an isosceles triangle when the frame 105 is in the expanded support position. Thus, for the embodiment of the frame 105 illustrated here, two of the legs 120, 125, 130 can be of the same length while the remaining leg 120, 125, 130 is a different length than the other two. In the example shown here, the first leg 120 and the second leg 125 are of the same length, while the third leg 130 is of a different (e.g., shorter) length than the first leg 120 and the second leg 125.

As also shown in FIG. 1, the first leg 120 and the second leg 125 can each include an angled region 145 between the lower end portion 135 and the upper end portion 140. This angled region 145 can be configured to create a clearance space at the frame 105 for the complex rehabilitation technology device 110 to operate, for instance when the frame 105 is in the expanded support position, such as shown in FIG. 1. As one example, the angled region 145 can facilitate movement of one or more components of the complex rehabilitation technology device 110 over each of the first leg 120 and the second leg 125 at the angled region 145 thereof. One specific such example can include movement of a leg support (e.g., between an adducted position and an abducted position) of the complex rehabilitation technology device 110 over one of the first leg 120 and the second leg 125 at the angled region 145.

Figure 9:
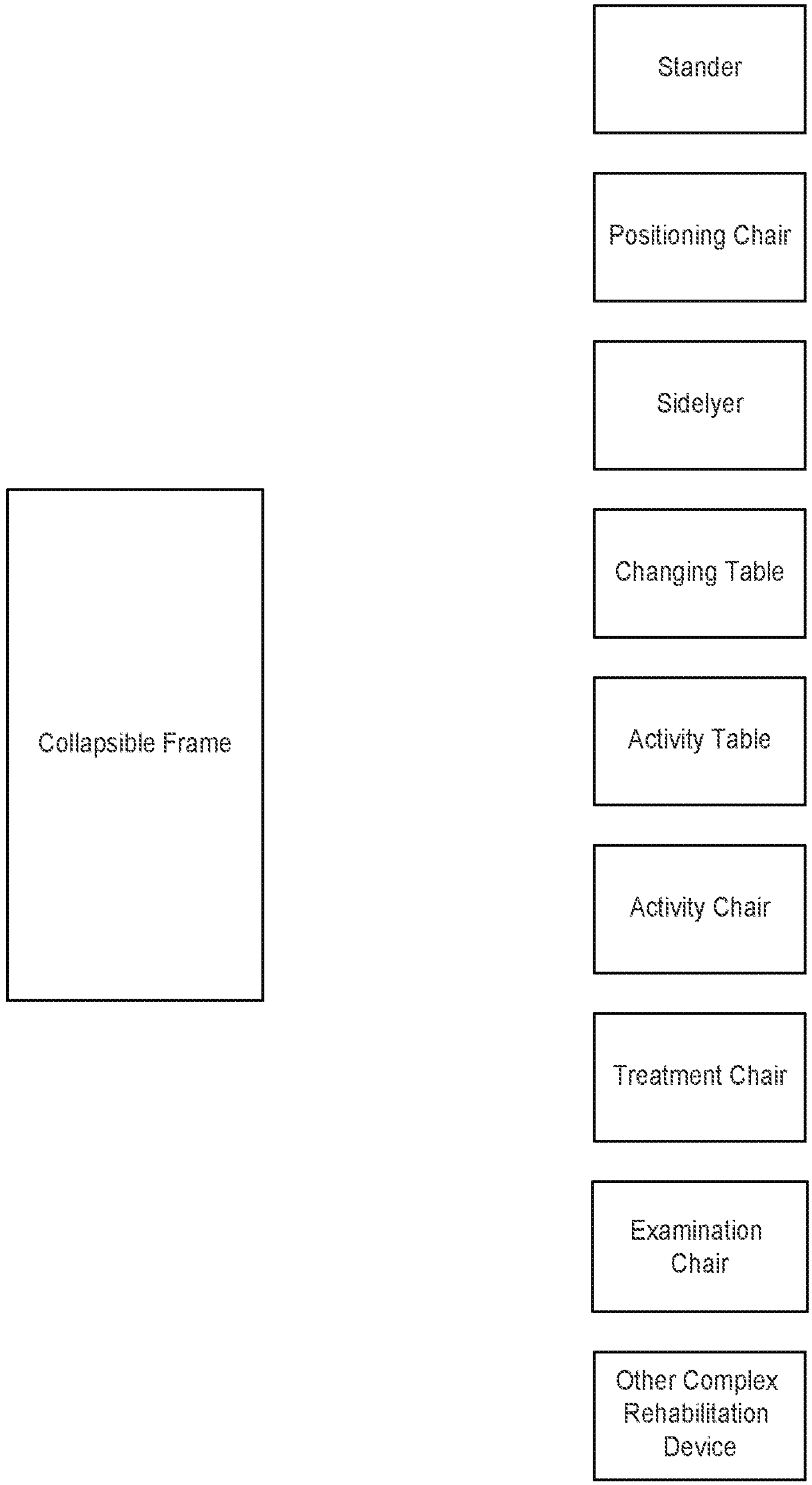
FIG. 9 is a schematic diagram showing complex rehabilitation technology devices that can be incorporated into carriable complex rehabilitation technology systems.

In the illustrated embodiment, the complex rehabilitation technology device 110 comprises a stander device. Where the complex rehabilitation technology device 110 comprises a stander device, such as in the illustrated embodiment, the complex rehabilitation technology system 100 can be referred to as a portable stander system. However, in other embodiments of the complex rehabilitation technology system 100, the complex rehabilitation technology device 110 can include various other types of complex rehabilitation technology devices. FIG. 9 shows other types of complex rehabilitation technology devices that can be used as the complex rehabilitation technology device 110 in the complex rehabilitation technology system 100, including a positioning chair, a sidelyer, a changing table, an activity table, an activity chair, a treatment chair, or an examination chair. The preceding list is illustrative, and other types of complex rehabilitation technology devices can also be used with the frame 105 to form a complex rehabilitation technology system within the scope of the present disclosure.

In the embodiment of FIGS. 1-4 where the complex rehabilitation technology device 110 is a stander device, the stander device can be coupled to the frame 105, and the stander device can be configured to be operable when the frame 105 is in the expanded support position, such as that shown in FIG. 1. The stander device can include a stander base 150, a trunk support 155, a first leg support 160, a second leg support 165, a first knee support 170, a second knee support 175, a first foot support 180, and a second foot support 185. The stander base 150 can be coupled to the frame 105. The trunk support 155 can be coupled to the stander base 150, for instance at a trunk support shaft 156 of the trunk support 155. The first leg support 160 can be coupled to the stander base 150, and the second leg support 165 can be coupled to the stander base 150. The first knee support 170 can be coupled to the first leg support 160, and the second knee support 175 can be coupled to the second leg support 165. The first foot support 180 can be coupled to the first leg support 160, and the second foot support 185 can be coupled to the second leg support 165.

In many instances, the trunk support 155 (and trunk support shaft 156) may be easily removably coupled to the stander base 150. When the complex rehabilitation technology system 100 is in a collapsed carriable position, the trunk support 155 may be coupled to the stander base 150 for a user to carry the complex rehabilitation technology system 100. A user may disassemble the complex rehabilitation technology system 100 for storage and transport. For example, the user may remove the trunk support 155 from the stander base 150 for storage and transport. In this manner, for storage and transport, the complex rehabilitation technology system 100 may have multiple distinct components—e.g., the trunk support 155 and the frame 105 combined with the other stander device components (stander base 150, first leg support 160, second leg support 165, first knee support 170, second knee support 175, first foot support 180, and second foot support 185). In some embodiments, as discussed elsewhere herein, the complex rehabilitation technology system 100 may include the frame 105 combined with the other stander device components, along with multiple trunk supports 155 removed from the frame 105 and other stander device components (e.g., supine trunk support **155*a* of FIGS. 1, 2, and 4 and prone trunk support 155*b* of FIG. 3**). In this way, a care provider may be able to easily store and transport a portable stander device that facilitates both supine and prone standing treatments.

The illustrated embodiment of the trunk support 155 shown in FIG. 1 is a supine trunk support **155*a*. One feature of the supine trunk support 155*a*, as shown in the illustrated embodiment, is a head rest 157. The supine trunk support 155*a* can be configured to support a patient at the complex rehabilitation technology system 100 in one or more supine positions. The supine trunk support 155*a* can be removably coupled to the stander base 150 when the complex rehabilitation technology system 100 is desired to be used to support a patient in one or more supine positions. In this way, the supine trunk support 155*a* can be removed from the stander base 150 so that, for instance, a different trunk support, configured for supporting the patient at the complex rehabilitation technology device 110 in one or more positions other than a supine position, can be coupled to the stander base 150** (e.g., a prone trunk support, as described elsewhere herein).

In the illustrated stander device embodiment, one or more components of the stander device can be movable between two or more positions to facilitate various anatomical orientations. For example, each of the first leg support 160 and the second leg support 165 can be configured to move between an adducted position 161 and an abducted position 162. In FIG. 1, each of the first leg support 160 and the second leg support 165 is shown in the adducted position 161. When desired, each of the first leg support 160 and the second leg support 165 can be moved from the adducted position 161 to the abducted position 162, for instance by pivoting each of the first leg support 160 and the second leg support 165 relative to the stander base 150. Depending on the extent of the abducted position 162, the first leg support 160 and the second leg support 165 can move over the angled region 145 of the respective first leg 120 and second leg 125 when moving to the abducted position 162.

Also in the illustrated stander device embodiment, each of the first foot support 180 and the second foot support 185 can be configured to move between a supine foot support position and a prone foot support position. FIG. 1 shows each of the first foot support 180 and the second foot support 185 in an exemplary supine foot support position. For example, the first foot support 180 can include a first heel support 182 that is configured to move (e.g., rotate) about the first foot support 180 to the supine foot support position associated with the supine trunk support **155*a*, and the second foot support 185 can include a second heel support 187 that is configured to move (e.g., rotate) about the second foot support 185 to the supine foot support position associated with the supine trunk support 155*a*. In this way, when the complex rehabilitation technology system 100 is to be used to support a patient in one or more supine positions, the supine trunk support 155*a* can be coupled to the stander base 150 and each of the first foot support 180 and the second foot support 185 can be positioned in the supine foot support position associated with the supine trunk support 155*a***.

In the illustrated embodiment where the complex rehabilitation technology device 110 is a stander device, the stander device can be configured to be movable between multiple positions. For example, the stander device can be configured to be movable between a loading position and a standing position. The stander device can define a trunk axis 190, for instance extending longitudinally along the trunk support 155. The trunk axis 190 can be closer to vertical when the stander device is in the standing position than when the stander device is in the loading position. FIG. 1 shows the stander device in one exemplary standing position. For example, the standing position of the stander device shown in FIG. 1 can be an exemplary supine standing position. The stander base 150 can define a stander base central horizontal plane 151 (e.g., that extends through the stander base 150 and runs parallel to the frame base 115). In many instances, the stander base 150 can be generally horizontal. When the stander device is in the standing position, the trunk axis 190 can form an angle $\theta_1$ with the stander base central horizontal plane 151 that is slightly greater than or slightly less than 90 degrees. In some instances, angle $\theta_1$ may be approximately 90 degrees.

To move the stander device between various positions, the complex rehabilitation technology system 100 can include an actuator 198. For example, when actuated, the actuator 198 can enable the stander device to move between the loading position and the standing position. As shown in the illustrated embodiment, the complex rehabilitation technology system 100 can include a handle 195, and the actuator 198 can be adjacent to, or positioned at, the handle 195. For instance, the handle 195 can be included at the frame 105, and the handle 195 can include the actuator 198. In one example, the actuator 198 can take the form of a trigger mechanism that is configured to be actuated by applying a force at (e.g., pulling the) actuator 198. When the force is applied at the actuator 198, the standing device can be unlocked so as to be freely movable relative to the frame base 115, for instance between loading and standing positions.

Figure 2:
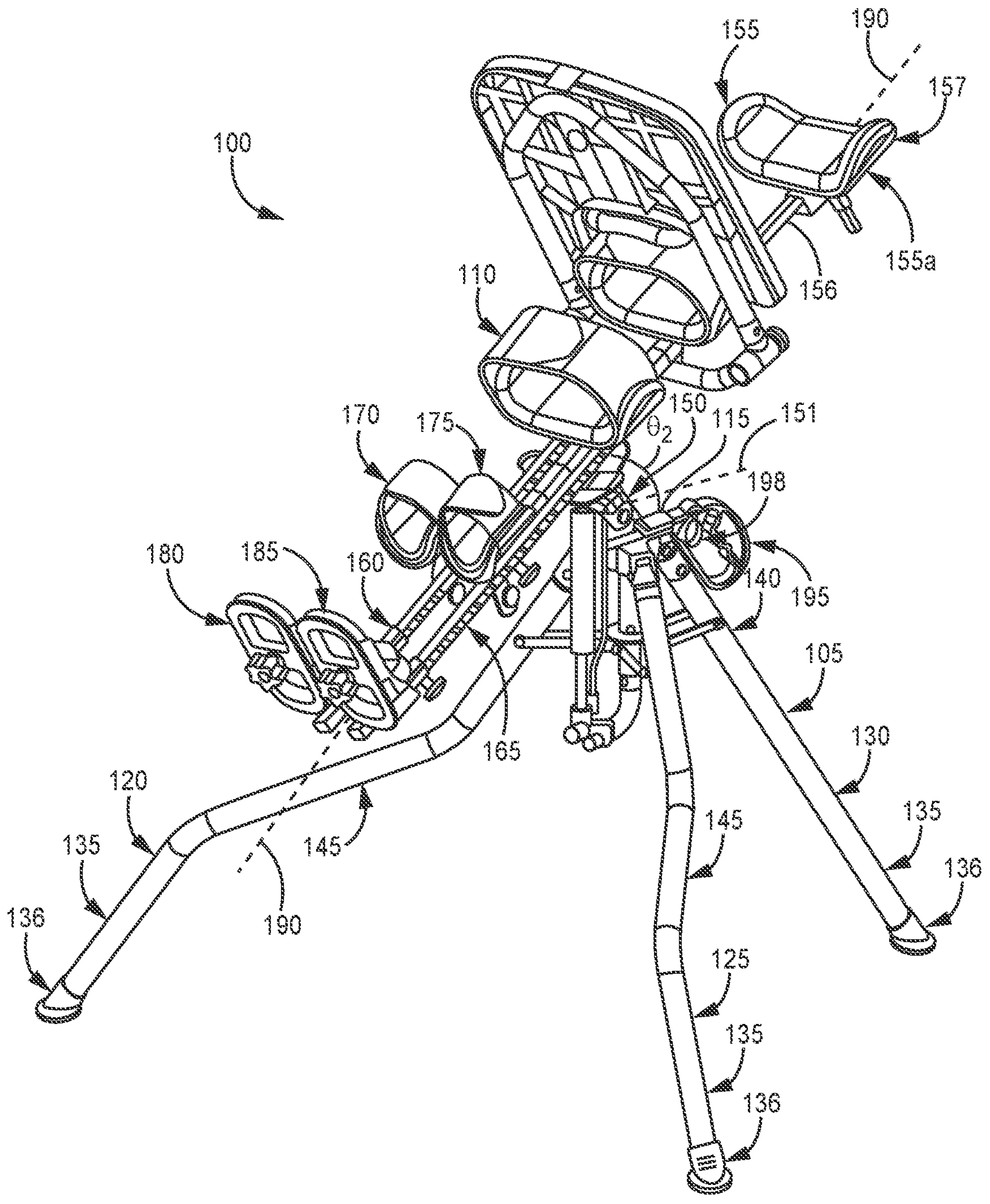
FIG. 2 is a perspective view of the complex rehabilitation technology system of FIG. 1 with a complex rehabilitation technology device shown in a loading position.

FIG. 2 shows the complex rehabilitation technology device 110, in this case the stander device, in one exemplary loading position. For example, the loading position of the stander device shown in FIG. 2 can be an exemplary supine loading position. When the stander device is in the supine loading position, the trunk axis 190 can form an angle $\theta_2$ with the stander base central horizontal plane 151 that is less than that angle $\theta_1$ when the stander device is in the standing position. In other words, the trunk axis 190 can be moved closer to the frame base 115 when the stander device is moved from the standing position to the supine loading position. The angle $\theta_2$ formed when the stander device is in the supine loading position, can range between 0 and 90 degrees, such as between 15 and 75 degrees, or between 30 and 60 degrees.

As noted, the actuator 198 can be actuated to move the stander device between the supine standing position and the supine loading position. For instance, the stander device can be movable (e.g., manually) relative to the frame base 115 when the actuator 198 is actuated (e.g. when the actuator 198 has a force applied thereat) and then lock in place when the actuator 198 is no longer actuated (e.g., when the force is no longer applied thereat). The frame 105 can remain in the expanded support position as the complex rehabilitation technology device 110 moves between the supine standing position and supine loading position.

Figure 3:
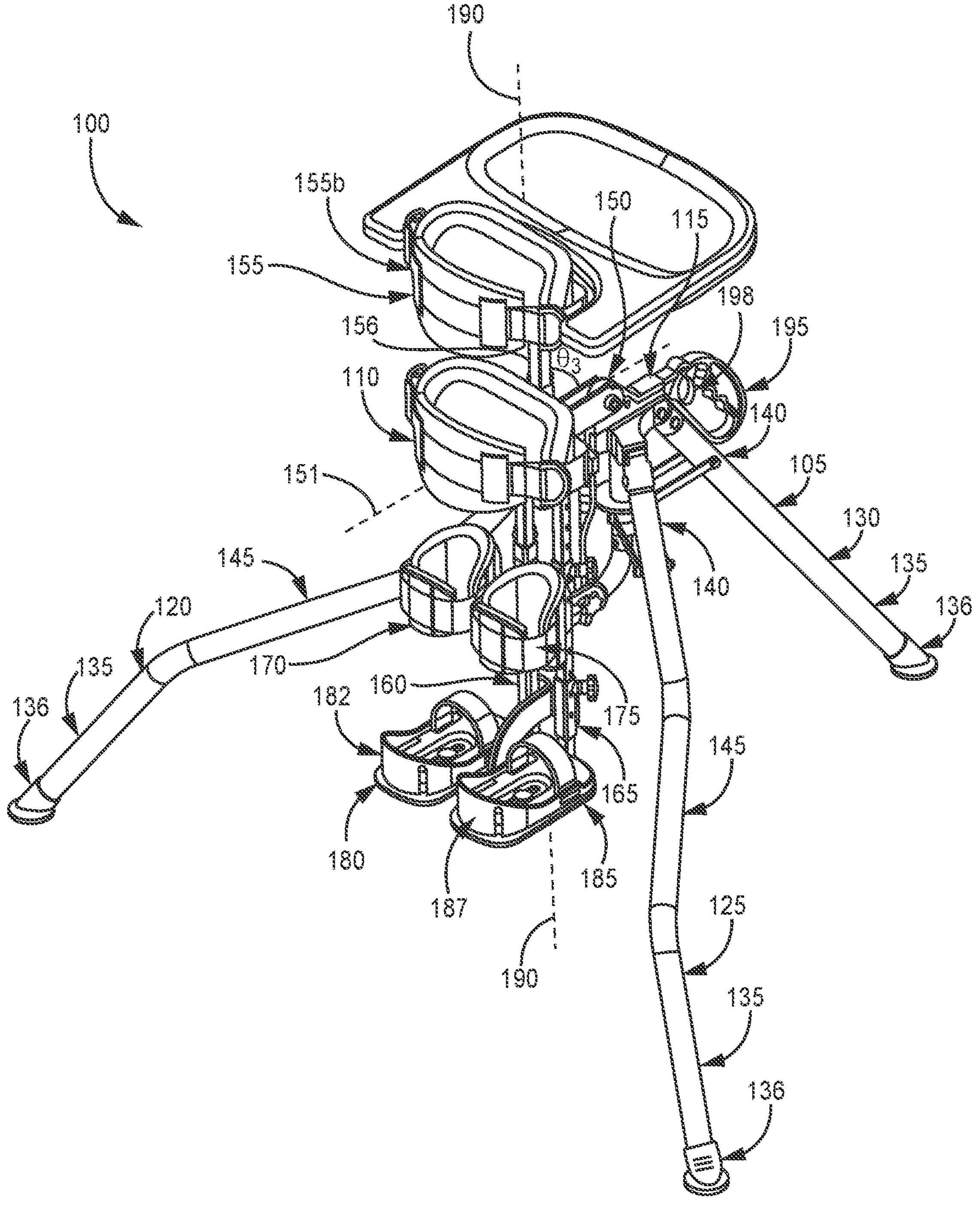
FIG. 3 is a perspective view of the complex rehabilitation technology system of FIG. 1 with a complex rehabilitation technology device shown in a generally vertical standing position.

FIG. 3 shows the complex rehabilitation technology system 100 with the complex rehabilitation technology device 110 configured for use in one or more prone positions. As noted, the trunk support 155 can be removably coupled to the stander base 150 such that the trunk support 155 can be removed and a different trunk support can be coupled to the stander base 150. FIG. 3 shows the trunk support 155 as a prone trunk support **155*b*. The prone trunk support 155*b*, as shown in the illustrated embodiment, does not have the head rest as does the illustrated embodiment of the supine trunk support 155*a*. The prone trunk support 155*b* can be configured to support a patient at the complex rehabilitation technology system 100 in one or more prone positions. The prone trunk support 155*b* can be removably coupled to the stander base 150 when the complex rehabilitation technology system 100 is desired to be used to support a patient in one or more prone positions. In this way, the prone trunk support 155*b* can be removed from the stander base 150 so that, for instance, a different trunk support, configured for supporting the patient at the complex rehabilitation technology device 110 in one or more positions other than a prone position, can be coupled to the stander base 150. For instance, the supine trunk support 155*a*, shown in FIGS. 1 and 2, can be removed from the stander base 150, and the prone trunk support 155*b*, shown in FIG. 3, can be coupled to the stander base 150 when the complex rehabilitation technology system 100** is desired to be used to support a patient in one or more prone positions.

As noted, in the illustrated stander device embodiment, each of the first foot support 180 and the second foot support 185 can be configured to move between foot support positions, including between a supine foot support position and a prone foot support position. FIG. 3 shows each of the first foot support 180 and the second foot support 185 in an exemplary prone foot support position. For example, the first foot support 180 can include a first heel support 182 that is configured to move (e.g., rotate) about the first foot support 180 to the prone foot support position associated with the prone trunk support **155*b*, and the second foot support 185 can include a second heel support 187 that is configured to move (e.g., rotate) about the second foot support 185 to the prone foot support position associated with the prone trunk support 155*b*. In this way, when the complex rehabilitation technology system 100 is to be used to support a patient in one or more prone positions, the prone trunk support 155*b* can be coupled to the stander base 150 and each of the first foot support 180 and the second foot support 185 can be positioned in the prone foot support position associated with the prone trunk support 155*b*. As can be seen, for instance in FIGS. 1 and 3, the prone foot support position and the supine foot support position can be defined as rotational positions of the heel supports 182, 187 at the respective foot supports 180, 185** approximately 180 degrees apart.

As noted, the complex rehabilitation technology device 110 can be configured to be movable between multiple positions. FIG. 3 shows the complex rehabilitation technology device 110, in this case the stander device with the prone trunk support **155*b*, in one exemplary prone standing position. When the stander device is in the standing position, the trunk axis 190 can form an angle $\theta_3$ with the stander base central horizontal plane 151 that is slightly greater than or slightly less than 90 degrees. The stander device can also have a vertical standing position (angle $\theta_3$ is 90 degrees). When the stander device is in the vertical standing position, the trunk axis 190 can be generally perpendicular to a support surface (e.g., a ground surface) on which the complex rehabilitation technology system 100** is positioned.

In some instances, a supine-loaded patient may be moved to a vertical standing position and beyond. FIGS. 11A-11D show four illustrative positions for such a supine-loaded patient. A trunk axis 590, which would extend generally through a patient's trunk when loaded in the stander device, is shown for purposes of illustration. A stander base central horizontal plane 551, which would extend generally horizontally through the center of the stander base, is also shown for purposes of illustration. The trunk axis 590 forms an angle $\theta$ with the stander base central horizontal plane 551, and angle $\theta$ changes as the stander moves through various positions.

Figure 11A:
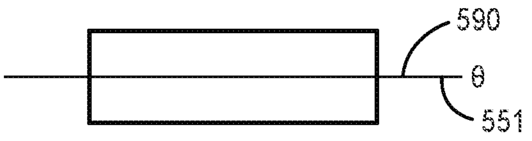
FIGS. 11A-11D are schematic diagrams of a supine-loaded patient being moved through various positions.

FIG. 11A shows the supine loading position. In many instances, the angle $\theta$ can be close to zero degrees when in the supine loading position. In some embodiments, the angle $\theta$ is greater than zero degrees when in the supine loading position (e.g., up to 30 degrees, up to 45 degrees, etc.). Optimal supine loading position may depend on the particular patient, the particular care provider, and/or a variety of factors.

Figure 11B:
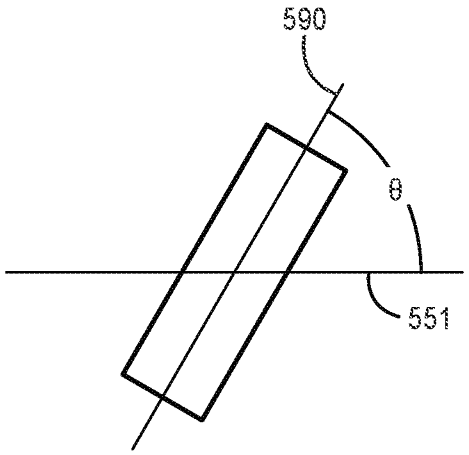
Figure 11C:
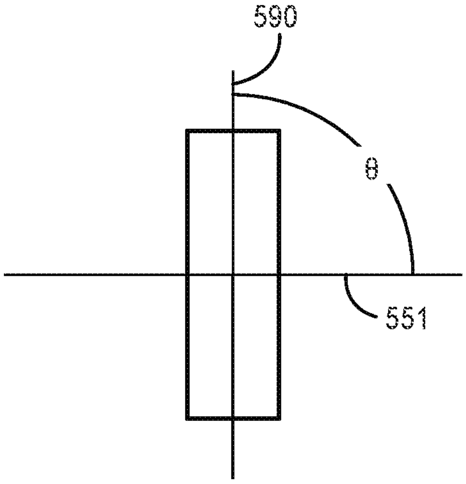
Figure 11D:
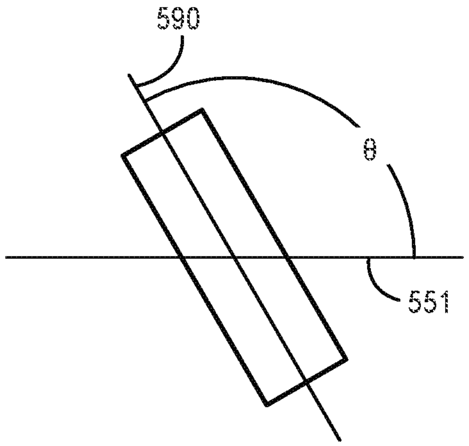

When the patient is safely loaded in the stander device, he or she may be moved into various standing positions. FIG. 11B shows the stander device in a supine standing position. In the supine standing position, the angle $\theta$ can be between 45 degrees and 90 degrees (e.g., 60-90 degrees). FIG. 11C shows the stander device in a vertical standing position. In the vertical standing position, the angle $\theta$ can be approximately 90 degrees (e.g., vertical). FIG. 11D shows the stander device in a prone standing position. In the prone standing position, the angle θ can be greater than 90 degrees. For example, the angle θ can be between 90 degrees and 135 degrees (e.g., 90-120 degrees). As shown in FIGS. 11A-11D, the angle θ is less than 90 degrees in the supine standing position and greater than 90 degrees in the prone standing position. In some embodiments, the stander device may move the supine-loaded patient into a prone position in which the angle θ approaches 180 degrees (e.g., 160-180 degrees). In some embodiments, a prone-loaded patient may likewise be moved through various positions similar to those discussed herein. In some embodiments, the stander device may move the patient (supine-loaded or prone-loaded) to an inverted position (e.g., angle θ is 180-360 degrees).

To selectively provide a relatively more compact footprint, the frame 105 can be movable to the collapsed carriable position. FIG. 4 shows one exemplary collapsed carriable position of the frame 105. Specifically, the frame 105 can be moved from the expanded support position, shown in FIGS. 1-3, to the collapsed carriable position shown in FIG. 4. In this way, the frame 105 can facilitate increased portability of the complex rehabilitation technology system 100.

To move between the expanded support position and the collapsed carriable position, at least two of the first leg 120, the second leg 125, and the third leg 130 can be movable relative to the tripod base 115 between the collapsed carriable position and the expanded support position. The first leg 120, the second leg 125, and the third leg 130 can be spaced further apart when in the expanded support position than when in the collapsed carriable position, such as that shown in FIG. 4. For example, in one embodiment of the frame 105, the first leg 120 and the second leg 125 can be movable (e.g., pivotable) relative to the tripod base 115 between the collapsed carriable position and the expanded support position. In such an embodiment of the frame 105, when the frame 105 is moved toward the collapsed carriable position, the lower end portion 135 of each of first leg 120 and the second leg 125 can be brought closer to the tripod base 115 than when in the expanded support position. In another embodiment of the frame 105, each of the first leg 120, the second leg 125, and the third leg 130 can be movable (e.g., pivotable) relative to the tripod base 115 between the collapsed carriable position and the expanded support position. In such an embodiment of the frame 105, when the frame 105 is moved toward the collapsed carriable position, the lower end portion 135 of each of first leg 120, the second leg 125, and the third leg 130 can be brought closer to the tripod base 115 than when in the expanded support position.

The ability of the frame 105 to move to the collapsed carriable position can provide a more compact footprint of the frame 105 as well as the complex rehabilitation technology system 100. This, in turn, can lead to increased portability of and thereby increase utilization of the complex rehabilitation technology system 100.

As a result of the frame 105 being movable to the collapsed carriable position, the complex rehabilitation technology system 100 can be configured for one-handed carrying. For example, as noted previously, the frame 105 can include the handle 195, and the handle 195 can facilitate one-handed carrying of the complex rehabilitation technology system 100. In some embodiments, the complex rehabilitation technology system may weigh no more than a carriable weight (e.g., no more than 50 pounds, no more than 60 pounds, no more than 70 pounds, etc.). In the embodiment illustrated in FIG. 4, the complex rehabilitation technology device 110 is in the form of a stander device and, as such, the complex rehabilitation technology system 100 can be referred to here as a portable stander system. The portable stander system can be configured for one-handed carrying via the handle 195. More specifically, the portable stander system can be configured for one-handed carrying via the handle 195 when the frame 105 is in the collapsed carriable position, such as that shown in FIG. 4. Thus, the stander device itself can be configured for one-handed carrying via the handle 195 when the frame 105 is in the collapsed carriable position. And, the stander device can be configured to be operable when the frame 105 is in the expanded support position.

Figure 10:
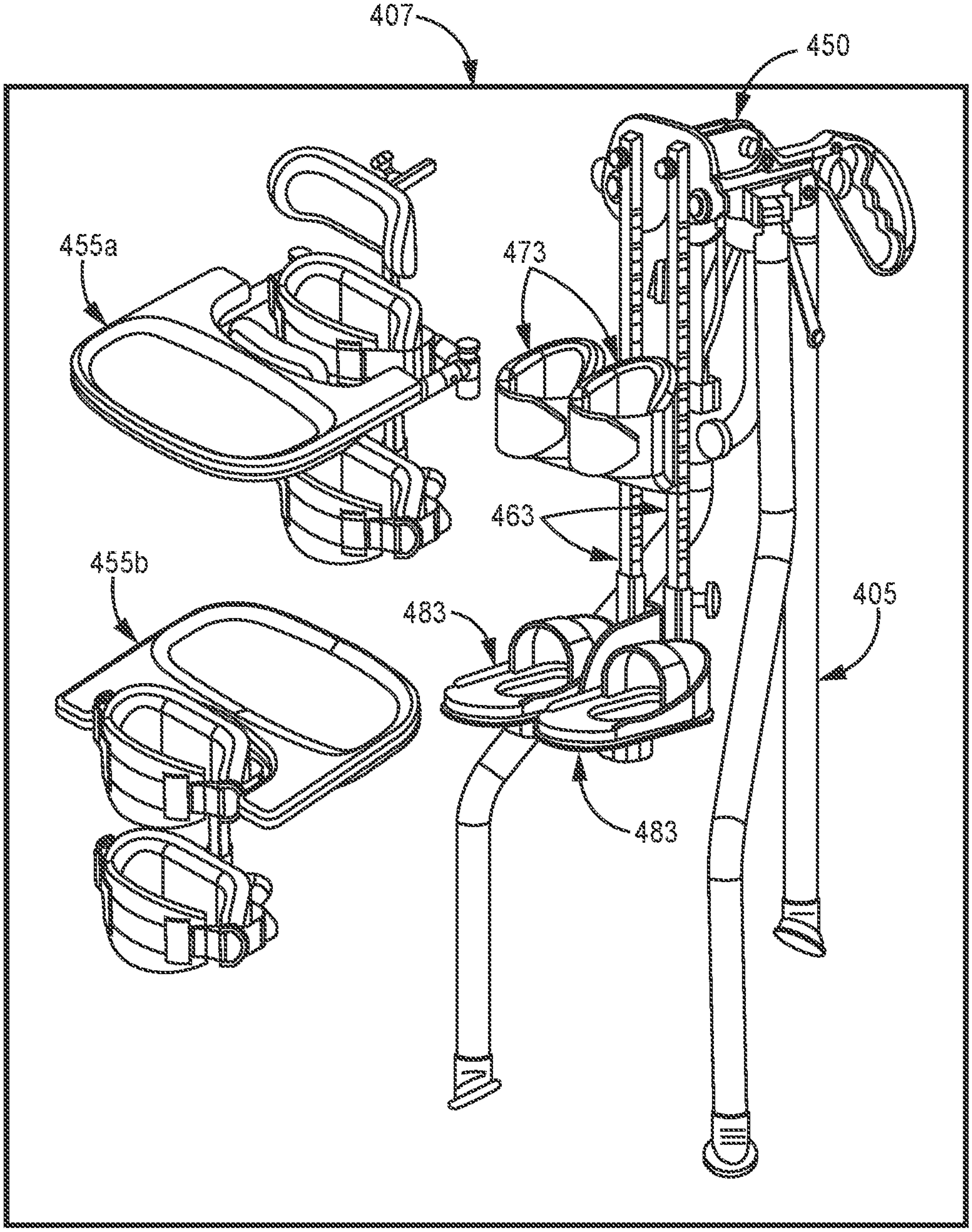
FIG. 10 is a perspective view of a complex rehabilitation technology system and a package for storage and transport.

The relatively more compact footprint resulting from the frame 105 moving to the collapsed carriable position can facilitate increased portability of the complex rehabilitation technology system 100 from one location to another. For example, in embodiments in which the complex rehabilitation technology device comprises a portable stander system, the frame 105 can be collapsible to fit the frame 105 and the portable stander system within an interior volume of a package of 150 liters or less, 125 liters or less, 100 liters of less, 80 liters or less, or 60 liters or less. For instance, in the case of the frame 105 being collapsible to fit the frame 105 and the portable stander system within an interior volume of a package of 100 liters, this would mean the frame 105 is collapsible to fit the frame 105 and the portable stander system within an interior volume of a package having dimensions of, for instance, 32 inches (e.g., length)×16 inches (e.g., width)×12 inches (e.g., height). In many embodiments, the portable stander system can include a stander base that is coupled to the frame and that holds leg supports, knee supports, and foot supports. The portable stander can also include supine and prone trunk supports that are each removably coupled to the stander base. As shown in FIG. 10, the frame 405 and stander base 450 (with attached leg supports 463, knee supports 473, and foot supports 483), the supine trunk support **455*a*, and the prone trunk support 455*b* may all fit within the specified interior volume of the package 407**.

In some instances, the package 407 can include a transportable container. Examples include a container with a hard-shell or soft-shell exterior, like a suitcase or a duffel bag. In some embodiments, the container may include one or more wheels to facilitate easier transport of the container.

The exemplary embodiment of the collapsible frame 105 illustrated and described up to this point forms a tripod. However, other embodiments of collapsible frames, to which the complex rehabilitation technology device 110 can be coupled to form the complex rehabilitation technology system 100, are within the scope of the present disclosure.

Figure 5:
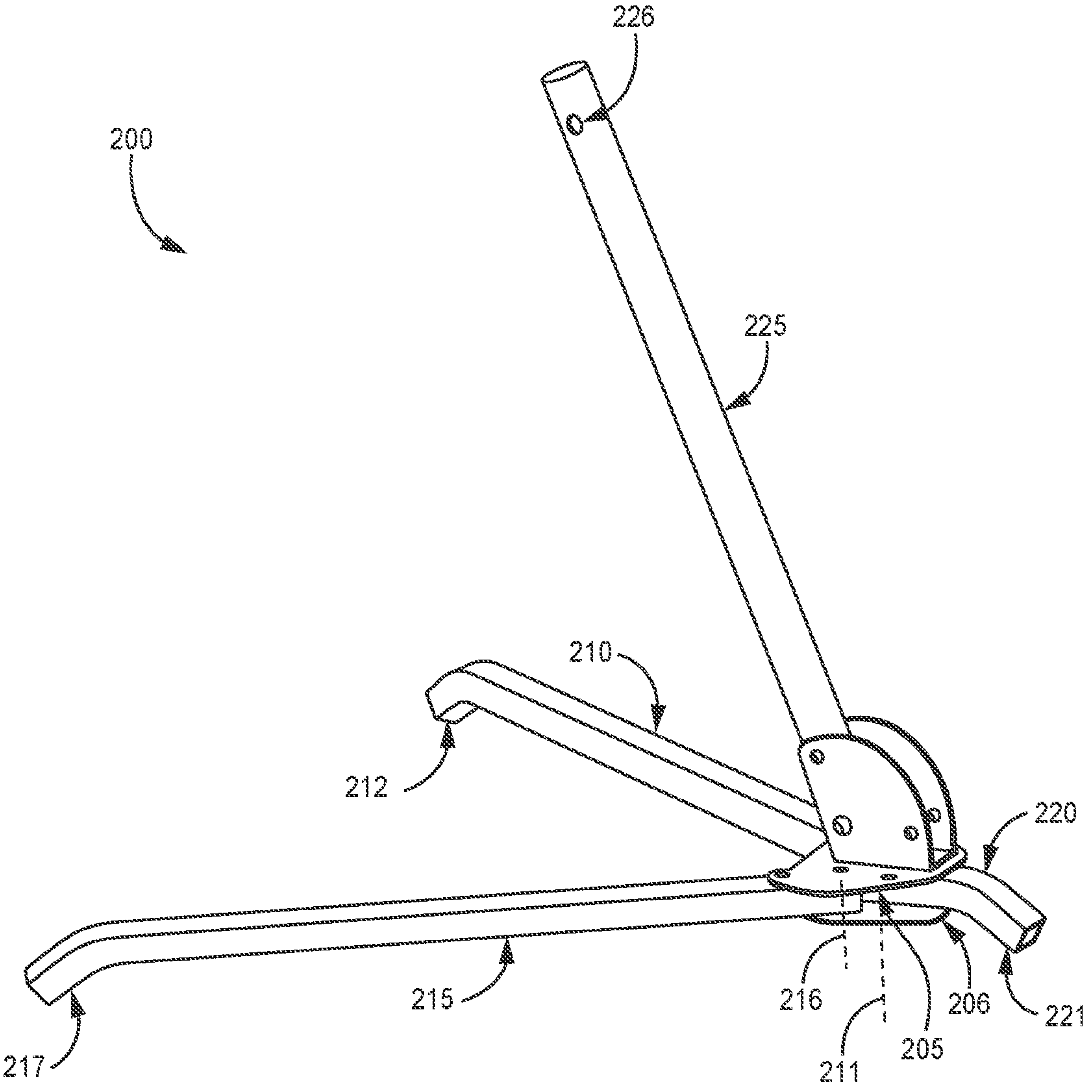
FIG. 5 is a perspective view of another embodiment of a frame that can be used as part of a complex rehabilitation technology system, with the frame shown in an expanded support position.
Figure 6:
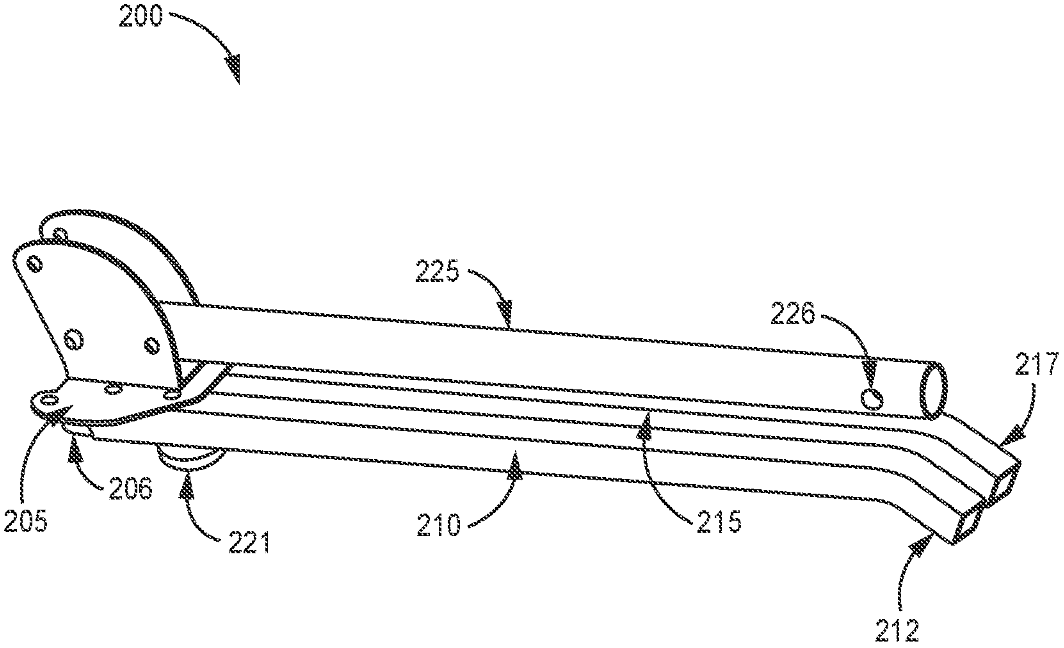
FIG. 6 is a perspective view of another embodiment of a frame that can be used as part of a complex rehabilitation technology system, with the frame shown in a collapsed carriable position.

FIGS. 5 and 6 illustrate similar embodiments of a frame 200 that can be included as part of the complex rehabilitation technology system 100. The frame 200 is movable between a collapsed carriable position and an expanded support position. FIG. 5 shows the frame 200 in an exemplary expanded support position, and FIG. 6 shows the frame 200 in an exemplary collapsed carriable position. The complex rehabilitation technology device 110 can be coupled to the frame 200, and the complex rehabilitation technology device 110 can be configured to be operable when the frame 200 is in the expanded support position.

The frame 200 includes a base 205, a first generally horizontal leg 210, a second generally horizontal leg 215, and a third generally horizontal leg 220. In the illustrated embodiment, the third generally horizontal leg 220 is shorter than each of the first generally horizontal leg 210 and the second generally horizontal leg 215. Also in the illustrated embodiment, the first generally horizontal leg 210 and the second generally horizontal leg 215 are of approximately equal length. The first generally horizontal leg 210 can be pivotally coupled to the base 205 about a first pivot axis 211, and the second generally horizontal leg 215 can be pivotally coupled to the base 205 about a second pivot axis 216. The third generally horizontal leg 220 can be coupled to the base 205, though, unlike the first and second generally horizontal legs 210, 215, in the illustrated embodiment of the frame 200 the third generally horizontal leg 220 may be fixedly coupled to the base 205. The base 205 can include a base foot 206, the first generally horizontal leg 210 can include a first foot 212, the second generally horizontal leg 215 can include a second foot 217, and the third generally horizontal leg 220 can include a third foot 221.

The frame 200 can further include a support coupling 225 via which the complex rehabilitation technology device 110 can be coupled to the frame 200. The support coupling 225 can be pivotally coupled to the base 205. The support coupling 225 can include a coupling mechanism 226 that is configured to couple to the complex rehabilitation technology device 110 (e.g., via the stander base 150).

As noted, the frame 200 is movable between a collapsed carriable position and an expanded support position. The complex rehabilitation technology device 110 can be configured to be operable when the frame 200 is in the expanded support position. For example, the first generally horizontal leg 210 and the second generally horizontal leg 215 can be movable relative to the base 205 between the expanded support position, shown in FIG. 5, and the collapsed carriable position, shown in FIG. 6. In the illustrated embodiment, each of the first generally horizontal leg 210 and the second generally horizontal leg 215 can pivot relative to the base 205 about the respective pivot axis 211, 216 between the expanded support position and the collapsed carriable position. Likewise, the support coupling 225 can be movable relative to the base 205 between the expanded support position, shown in FIG. 5, and the collapsed carriable position, shown in FIG. 6. In the illustrated embodiment, the support coupling 225 can pivot relative to the base 205 between the expanded support position and the collapsed carriable position.

FIG. 6 shows the frame 200 in the collapsed carriable position. As shown here, the first generally horizontal leg 210 and the second generally horizontal leg 215 can be spaced closer together in the collapsed carriable position than in the expanded support position. When moved to the collapsed carriable position, the first generally horizontal leg 210, the second generally horizontal leg 215, and the support coupling 225 can each be pivoted about the base 205 toward the third generally horizontal leg 220. In this way, when in the collapsed carriable position, each of the first generally horizontal leg 210, the second generally horizontal leg 215, the third generally horizontal leg 220, and the support coupling 225 can be adjacent one another. As shown in FIG. 6, when in the collapsed carriable position, the first generally horizontal leg 210 can be on one side of the third generally horizontal leg 220, the second generally horizontal leg 215 can be on an opposite side of the third generally horizontal leg 220, and the support coupling 225 can be positioned over the third generally horizontal leg 220. As a result, the collapsed carriable position of the frame 200 can provide a more compact footprint.

Figure 7:
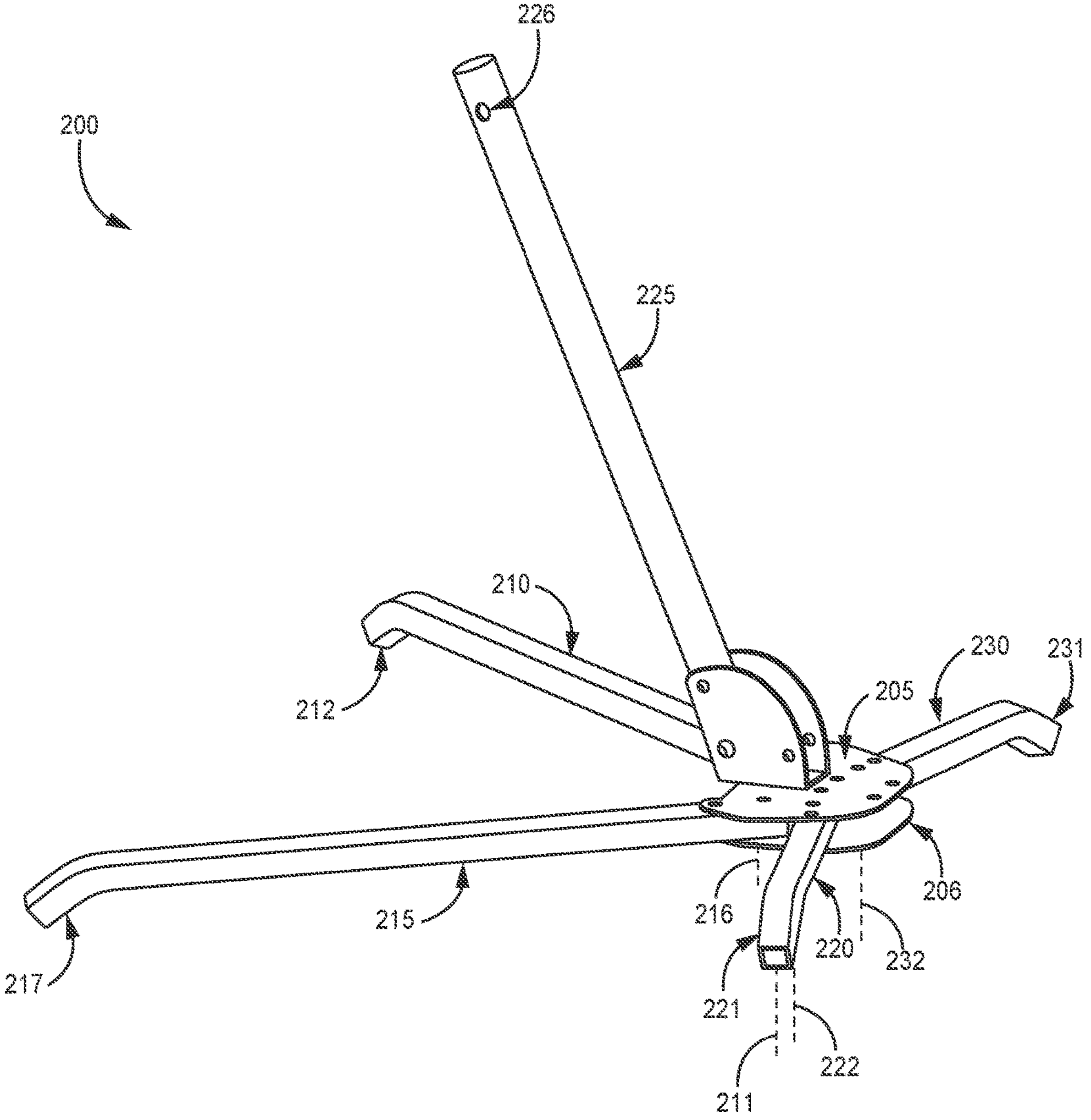
FIGS. 7 and 8 are perspective views of a further embodiment of a frame that can be used as part of a complex rehabilitation technology system.
Figure 8:
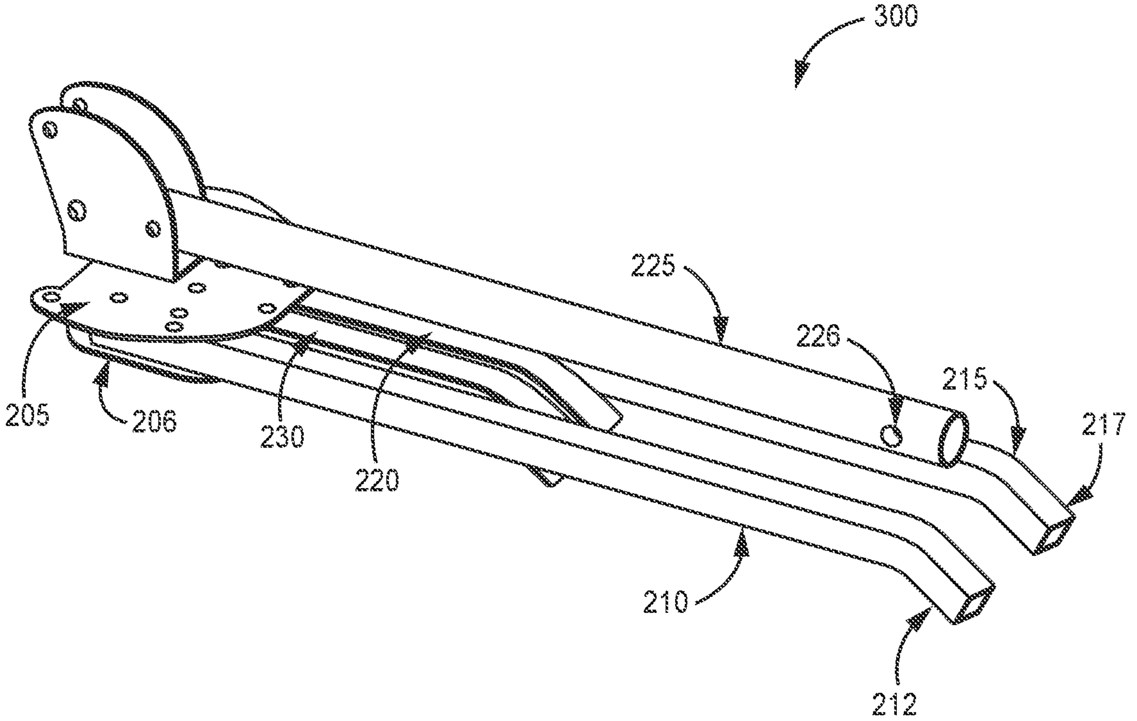

FIGS. 7 and 8 illustrate another embodiment of a frame 300 that can be included as part of the complex rehabilitation technology system 100. The frame 300 is movable between a collapsed carriable position and an expanded support position. FIG. 7 shows the frame 300 in an exemplary expanded support position, and FIG. 8 shows the frame 300 in an exemplary collapsed carriable position. The complex rehabilitation technology device 110 can be coupled to the frame 300, and the complex rehabilitation technology device 110 can be configured to be operable when the frame 300 is in the expanded support position.

The frame 300 can be similar to, or the same as, the frame 200 except as otherwise described here.

The frame 300 includes the base 205, the first generally horizontal leg 210, the second generally horizontal leg 215, the third generally horizontal leg 220, and a fourth generally horizontal leg 230. In the illustrated embodiment, each of the third generally horizontal leg 220 and the fourth generally horizontal leg 230 is shorter than each of the first generally horizontal leg 210 and the second generally horizontal leg 215. Also in the illustrated embodiment, the first generally horizontal leg 210 and the second generally horizontal leg 215 are of approximately equal length, and the third generally horizontal leg 220 and the fourth generally horizontal leg 230 are of approximately equal length. The first generally horizontal leg 210 can be pivotally coupled to the base 205 about the first pivot axis 211, and the second generally horizontal leg 215 can be pivotally coupled to the base 205 about the second pivot axis 216. Likewise, the third generally horizontal leg 220 can be pivotally coupled to the base 205 about a third pivot axis 222, and the fourth generally horizontal leg 230 can be pivotally coupled to the base 205 about a fourth pivot axis 232. The base 205 can include the base foot 206, the first generally horizontal leg 210 can include the first foot 212, the second generally horizontal leg 215 can include the second foot 217, the third generally horizontal leg 220 can include a third foot 221, and the fourth generally horizontal leg 230 can include a fourth foot 231.

As noted, the frame 300 is movable between a collapsed carriable position and an expanded support position. The complex rehabilitation technology device 110 can be configured to be operable when the frame 300 is in the expanded support position. For example, the first generally horizontal leg 210 and the second generally horizontal leg 215 can be movable relative to the base 205 between the expanded support position, shown in FIG. 7, and the collapsed carriable position, shown in FIG. 8. In the illustrated embodiment, each of the first generally horizontal leg 210 and the second generally horizontal leg 215 can pivot relative to the base 205 about the respective pivot axis 211, 216 between the expanded support position and the collapsed carriable position. Also in the illustrated embodiment, the third generally horizontal leg 220 and the fourth generally horizontal leg 230 can be movable relative to the base 205 between the expanded support position, shown in FIG. 7, and the collapsed carriable position, shown in FIG. 8. In the illustrated embodiment, each of the third generally horizontal leg 220 and the fourth generally horizontal leg 230 can pivot relative to the base 205 about the respective pivot axis 222, 232 between the expanded support position and the collapsed carriable position. Likewise, the support coupling 225 can be movable (e.g., pivotable) relative to the base 205 between the expanded support position, shown in FIG. 7, and the collapsed carriable position, shown in FIG. 8.

FIG. 8 shows the frame 300 in the collapsed carriable position. As shown here, the first generally horizontal leg 210 and the second generally horizontal leg 215 can be spaced closer together in the collapsed carriable position than in the expanded support position. And, as shown here, the third generally horizontal leg 220 and the fourth generally horizontal leg 230 can be spaced closer together in the collapsed carriable position than in the expanded support position. When moved to the collapsed carriable position, each of the first generally horizontal leg 210, the second generally horizontal leg 215, the third generally horizontal leg 220, the fourth generally horizontal leg 230, and the support coupling 225 can be pivoted about the base 205 toward each other.

In this way, when in the collapsed carriable position, each of the first generally horizontal leg 210, the second generally horizontal leg 215, the third generally horizontal leg 220, the fourth generally horizontal leg 230, and the support coupling 225 can be adjacent one another. As shown in FIG. 8, when in the collapsed carriable position, the first generally horizontal leg 210 can be on (e.g., contacting) one side of the third generally horizontal leg 220. Also, as shown in FIG. 8, when in the collapsed carriable position, the second generally horizontal leg 215 can be on (e.g., contacting) one side of the fourth generally horizontal leg 230. Further, when in the collapsed carriable position shown in FIG. 8, the third generally horizontal leg 220 and the fourth generally horizontal leg 230 can brought toward one another such that the respective side of each, opposite the respective leg 220, 230, can interface (e.g., contact) with one another. And, when in the collapsed carriable position shown in FIG. 8, the support coupling 225 can be positioned over the third generally horizontal leg 220 and/or the fourth generally horizontal leg 230. As a result, the collapsed carriable position of the frame 200 can provide a more compact footprint.

Various complex rehabilitation technology systems described herein can include a frame and a complex rehabilitation technology device are separable into multiple components when in the collapsed carriable position. For example, the frame and the complex rehabilitation technology device may be separated from one another. In such examples, the frame may be carriable with one hand, and the complex rehabilitation technology device may be carried with the other hand. In some examples, one separable component may include the frame and part of the complex rehabilitation technology device, and another separable component may include the remainder of the complex rehabilitation technology device. In some examples, one separable component may include part of the frame and the complex rehabilitation technology device, and another separable component may include the remainder of the frame. Some complex rehabilitation technology systems can be separable into three or more components for portable, carriable transport.

Figure 12:
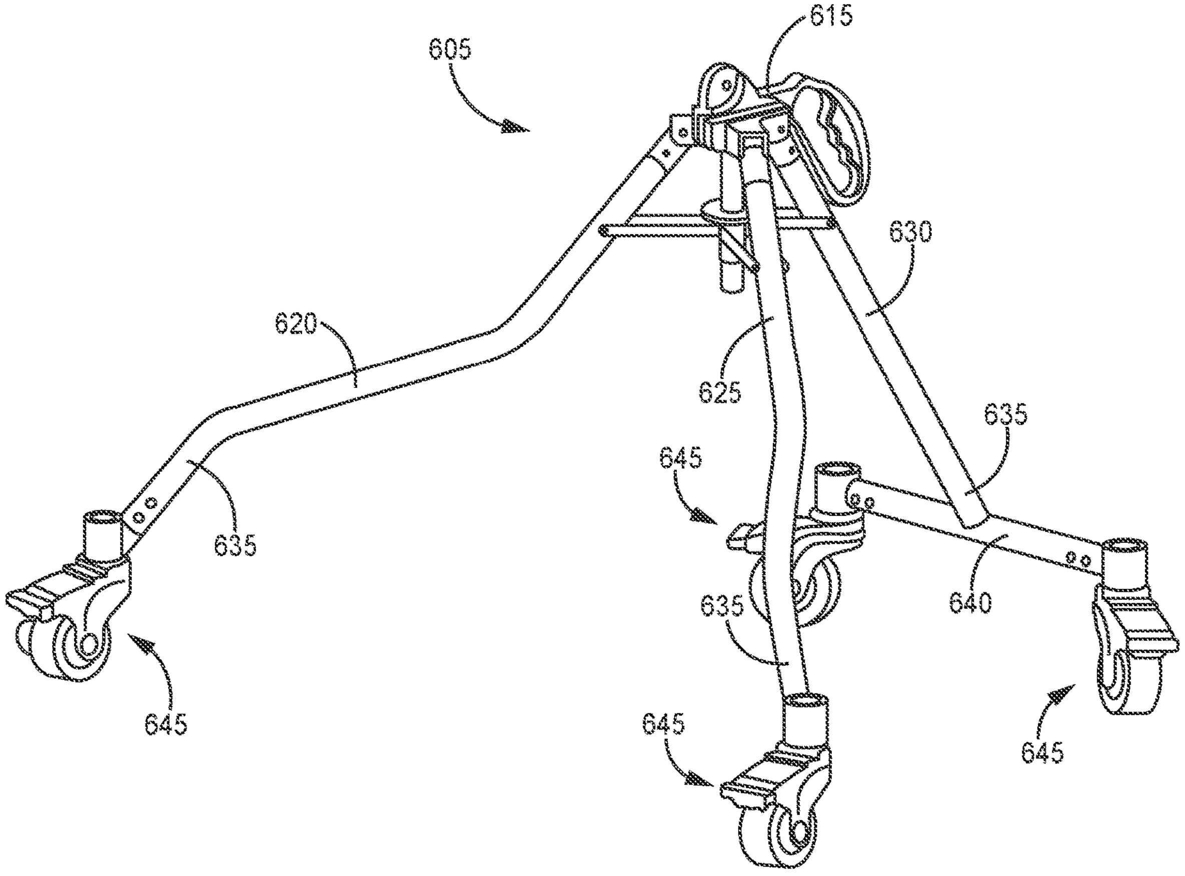
FIG. 12 is a perspective view of a frame that can be used as part of a complex rehabilitation technology system.

FIG. 12 shows an illustrative frame 605 that can be used in various complex rehabilitation technology systems. For example, the frame 605 can be configured to support any of the complex rehabilitation technology systems discussed herein. As shown, the frame 605 includes a tripod base 615, along with a first leg 620, a second leg 625, and a third leg 630. Each of the first leg 620, second leg 625, and third leg 630 may include a lower end portion 635 that is opposite to an upper end portion, which attaches to the tripod base 615. The lower end portion 635 of the first leg 620 and the lower end portion 635 of the second leg 625 may each be coupled to casters 645. The lower end portion 635 of the third leg 630 may be coupled to a cross-support 640, which may have casters 645 coupled to its opposing end portions. In some embodiments, the lower end portion 635 of the third leg 630 may be coupled to a caster 645 like the lower end portions 635 of the first leg 620 and the second leg 625. The casters 645 may allow the frame 605 to easily roll from one position to another. When the frame 605 is in the desired position, the casters 645 may be locked to stabilize the frame 605 for operation and use of the complex rehabilitation technology device. Various kinds of casters 645 may be used in connection with the frame 605.

Figure 13:
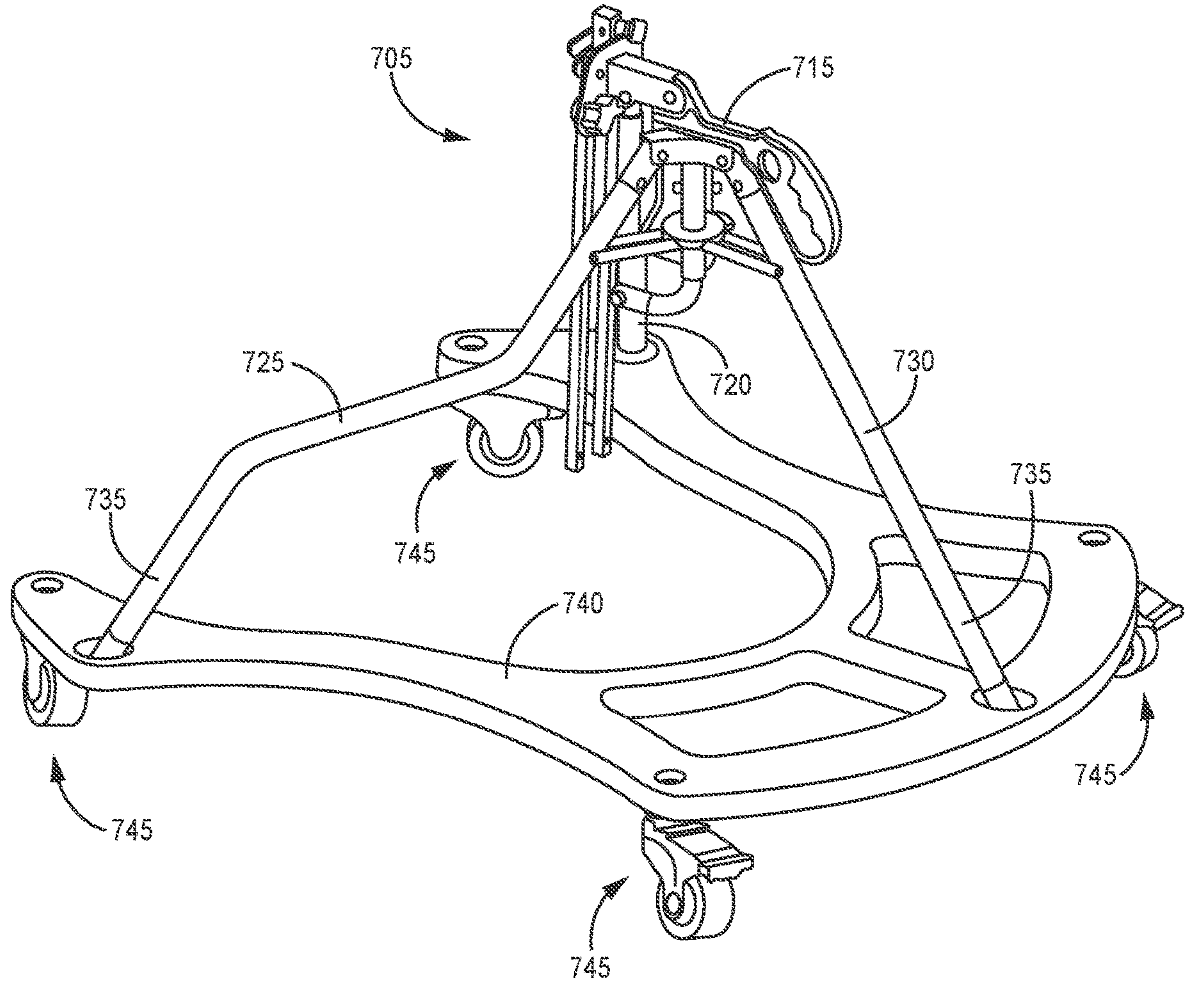
FIG. 13 is a perspective view of a frame and a platform that can be used as part of a complex rehabilitation technology system.

FIG. 13 shows an illustrative frame 705 and platform 740 that can be used in various complex rehabilitation technology systems. For example, the frame 705 can be configured to support any of the complex rehabilitation technology systems discussed herein. As in other frames discussed herein, the frame 705 can include a tripod base 715, along with a first leg 720, a second leg 725, and a third leg 730. Each of the first leg 720, second leg 725, and third leg 730 may include a lower end portion 735 that is opposite to an upper end portion, which attaches to the tripod base 715. The platform 740 may include slots for receiving and supporting the lower end portions 735 of the first leg 720, second leg 725, and third leg 730. The lower end portions 735 of the first leg 720, second leg 725, and third leg 730 may be removably received in the slots of the platform 740, such that when the frame 705 is movable into the collapsed carriable position, the frame 705 and the platform 740 are separated from one another, with the frame 705 and platform 740 being separately carriable (e.g., one in one hand, the other in the other hand). The platform 740 may have a variety of shapes and configurations, depending on the structure of the frame 705 and/or corresponding complex rehabilitation technology device, the operation of the complex rehabilitation technology device, etc. The platform 740 may include a plurality of casters 745. Four casters 745 are shown in the example of FIG. 13, though any suitable number of casters 745 may be used. The casters 745 may allow the platform 740 and the frame 705 to easily roll from one position to another. When the platform 740 and the frame 705 are in the desired position, the casters 745 may be locked to stabilize the platform 740 and the frame 705 for operation and use of the complex rehabilitation technology device. Various kinds of casters 745 may be used in connection with the frame 705.

Figure 14:
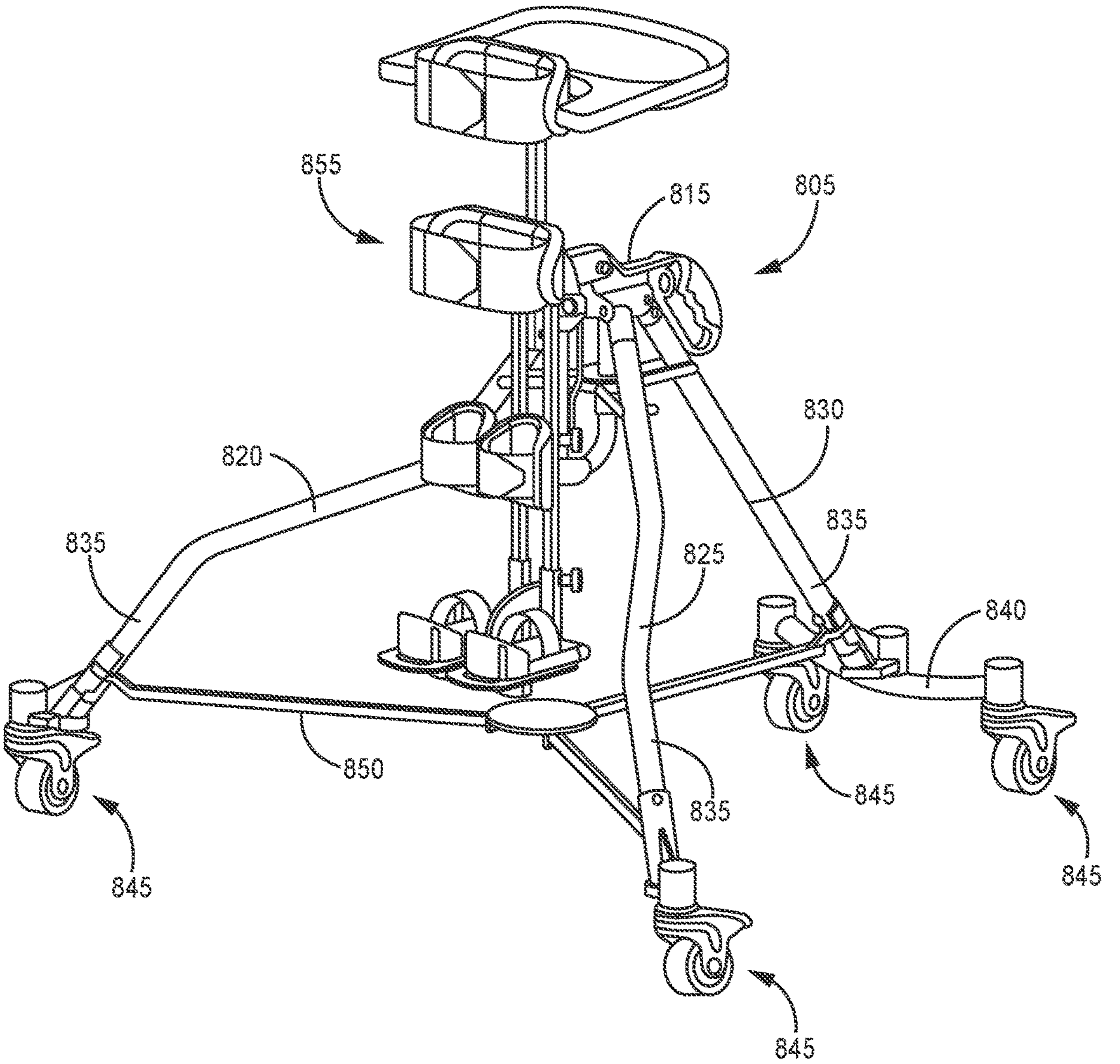
FIG. 14 is a perspective view of a frame and stander device.

FIG. 14 shows an illustrative complex rehabilitation technology system with a frame 805 and a stander that includes a prone trunk support 855 (such as those discussed elsewhere herein). The frame 805 can be configured to support any of the complex rehabilitation technology systems discussed herein. As shown, the frame 805 includes a tripod base 815, along with a first leg 820, a second leg 825, and a third leg 830. Each of the first leg 820, second leg 825, and third leg 830 may include a lower end portion 835 that is opposite to an upper end portion, which attaches to the tripod base 815. The lower end portion 835 of the first leg 820 and the lower end portion 835 of the second leg 825 may each be coupled to casters 845. The lower end portion 835 of the third leg 830 may be coupled to a cross-support 840, which may have casters 845 coupled to its opposing end portions. In some embodiments, the lower end portion 835 of the third leg 830 may be coupled to a caster 845 like the lower end portions 835 of the first leg 820 and the second leg 825. The casters 845 may allow the frame 805 to easily roll from one position to another. When the frame 805 is in the desired position, the casters 845 may be locked to stabilize the frame 805 for operation and use of the complex rehabilitation technology device. Various kinds of casters 845 may be used in connection with the frame 805.

As shown in FIG. 14, a brace 850 can support the tripod of the frame 805. The brace 850 can be coupled to the first leg 820, the second leg 825, and the third leg 830. The brace

850 can expand and collapse with the tripod and can support the tripod when the frame is in the expanded support position.

Figure 15:
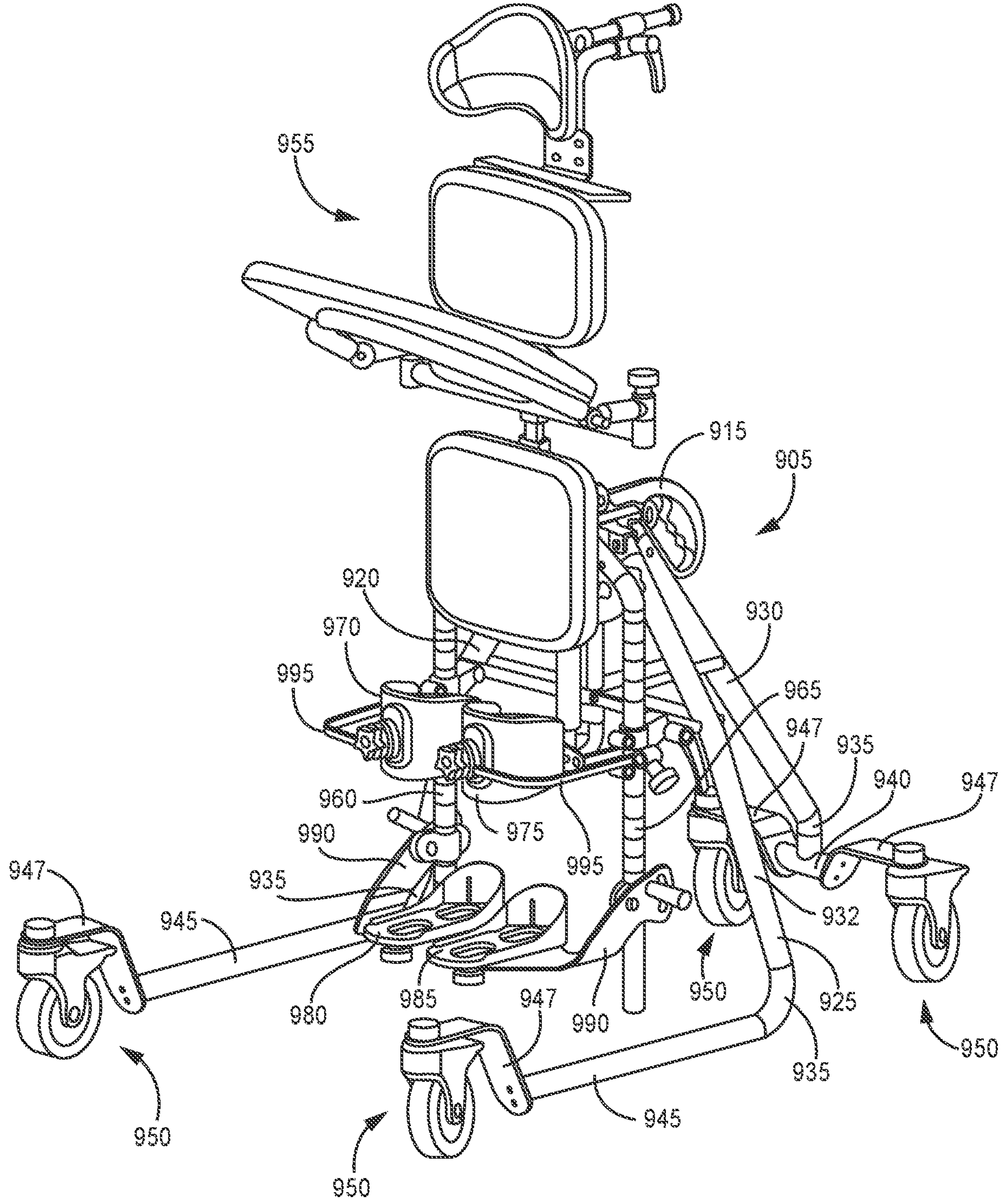
FIG. 15 is a perspective view of a frame and stander device.
Figure 16:
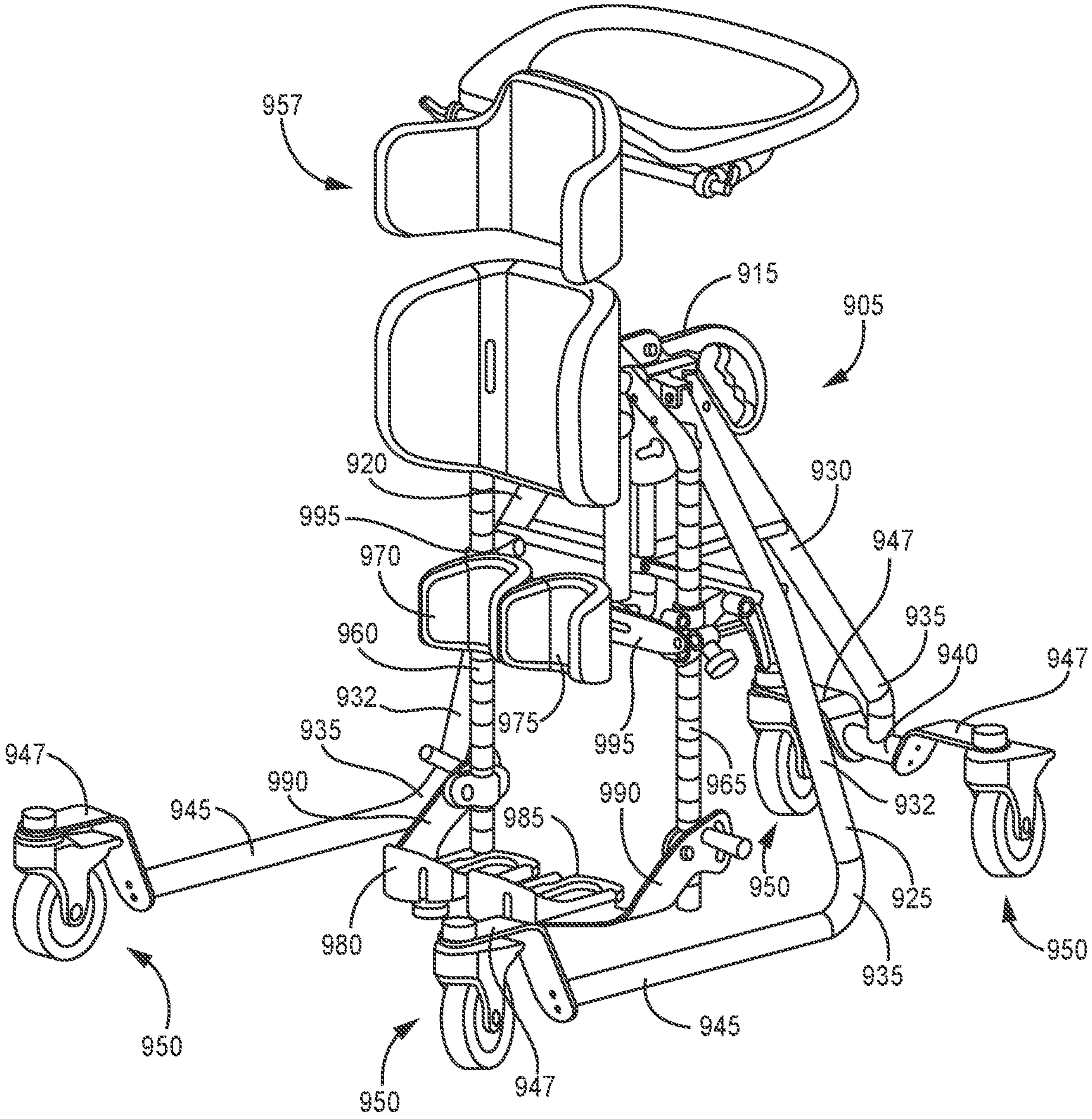
FIG. 16 is a perspective view of a frame and stander device.

FIGS. 15 and 16 show complex rehabilitation technology systems with a frame 905 and a stander-FIG. 15 with a supine trunk support 955, and FIG. 16 with a prone trunk support 957. The frame 905 can be configured to support any of the complex rehabilitation technology systems discussed herein. As shown, the frame 905 includes a base 915, along with a first leg 920, a second leg 925, and a third leg 930. The first leg 920 and the second leg 925 may each include an angled section 932 that has a lower end portion 935 that is opposite to an upper end portion, which attaches to the base 915. The first leg 920 and the second leg 925 may each also include a horizontal section 945 and a caster connector 947. The angled sections 932 may extend generally sideways and downward from the base 915 at one or more angles. The horizontal sections 945 may extend toward the front of the frame 905. Such a structure with the angled sections 935 and the horizontal sections may allow for enhanced functionality of the stander. The third leg 930 may include a lower portion 935 coupled to a cross support 940, which can include caster connectors 947 on its opposing end portions. The caster connectors 947 may be coupled to casters 950. The casters 950 may allow the frame 905 to easily roll from one position to another. When the frame 905 is in the desired position, the casters 950 may be locked to stabilize the frame 905 for operation and use of the stander. Various kinds of casters 950 may be used in connection with the frame 905.

The supine trunk support 955 of FIG. 15 and the prone trunk support 957 of FIG. 16 include features that can be incorporated into any of the stander examples described herein. Both include a first leg support 960 and a second leg support 965, as well as a first knee support 970, second knee support 975, first foot support 980, and second foot support 985. Both also include a connector 995 that connects the knee supports 970, 975 and a connector 990 that connects the foot supports 980, 985 to the leg supports 960, 965. Each leg support 960, 965 can include incremental adjustment markers configured to facilitate positioning of the knee supports 970, 975 and the foot supports 980, 985. For example, the adjustment markers may include a notch spaced a fixed distance (e.g., 1 cm) from neighboring notches, and the connectors 990, 995 may include tabs with structure that complements that of the notches to enable secure attachment of the connectors 990, 995 to the leg supports 960, 965. Such adjustment markers may facilitate precise, secure positioning of the knee supports 970, 975 and the foot supports 980, 985 relative to the leg supports 960, 965.

Various examples have been described. These and other examples are within the scope of the following claims.

What is claimed is:

1. A complex rehabilitation technology system comprising:

a frame that is movable between a collapsed carriable position and an expanded support position, the frame comprising a tripod, the tripod comprising:

a tripod base;

a first leg having an upper end portion and a lower end portion, the first leg hingedly attached to the tripod base at the upper end portion of the first leg via a first hinged connection;

a second leg having an upper end portion and a lower end portion, the second leg hingedly attached to the tripod base at the upper end portion of the second leg via a second hinged connection; and a third leg having an upper end portion and a lower end portion, the third leg hingedly attached to the tripod base at the upper end portion of the third leg via a third hinged connection;

wherein each of the first leg, the second leg, and the third leg are individually movable relative to the tripod base; and a complex rehabilitation technology device coupled to the tripod base, the complex rehabilitation technology device configured to be operable when the frame is in the expanded support position, wherein the complex rehabilitation technology device comprises a stander device, the stander device comprising a stander base coupled to the frame, the stander base configured to hold one or more leg supports, one or more knee supports, and one or more foot supports.

2. The complex rehabilitation technology system of claim 1, wherein at least two of the first leg, the second leg, and the third leg are movable relative to the tripod base between the collapsed carriable position and the expanded support position, and wherein the first leg, the second leg, and the third leg are spaced further apart when in the expanded support position than when in the collapsed carriable position.

3. The complex rehabilitation technology system of claim 1, wherein each of the first leg, the second leg, and the third leg includes a lower end portion and an opposite upper end portion that is attached to the tripod base, the lower end portion of the first leg, the lower end portion of the second leg, and the lower end portion of the third leg forming an isosceles triangle when the frame is in the expanded support position.

4. The complex rehabilitation technology system of claim 3, wherein the first leg and the second leg each include an angled region between the lower end portion and the upper end portion, the angled region configured to create a clearance space at the frame for the complex rehabilitation technology device to operate when the frame is in the expanded support position.

5. The complex rehabilitation technology system of claim 1, wherein the tripod further comprises a brace coupled to each of the first, second, and third legs, the brace being configured to expand and collapse with the tripod and to support the tripod when the frame is in the expanded support position.

6. The complex rehabilitation technology system of claim 1, wherein each of the first leg, the second leg, and the third leg includes a lower end portion and an opposite upper end portion that is attached to the tripod base, and wherein the frame further comprises:

a first caster coupled to the lower end portion of the first leg, a second caster coupled to the lower end portion of the second leg, a cross-support coupled to the lower end portion of the third leg, and third and fourth casters coupled to opposing end portions of the cross-support.

7. The complex rehabilitation technology system of claim 1, wherein the stander device further comprises:

a trunk support coupled to the stander base, and wherein the one or more leg supports comprises a first leg support coupled to the stander base and a second leg support coupled to the stander base;

wherein the one or more knee supports comprises a first knee support coupled to the first leg support and a second knee support coupled to the second leg support; and wherein the one or more foot supports comprises a first foot support coupled to the first leg support and a second foot support coupled to the second leg support.

8. The complex rehabilitation technology system of claim 7, wherein each of the first leg support and the second leg support is configured to move between an adducted position and an abducted position.

9. The complex rehabilitation technology system of claim 7, wherein the stander device defines a trunk axis, the stander device being movable between a loading position and a standing position, the trunk axis being closer to vertical when the stander device is in the standing position than when the stander device is in the loading position.

10. The complex rehabilitation technology system of claim 9, further comprising:

a handle that includes an actuator that when actuated enables the stander device to move between the loading position and the standing position.

11. The complex rehabilitation technology system of claim 7, wherein the stander device defines a trunk axis, the stander device being movable between a supine loading position, a supine standing position, a vertical standing position, and a prone standing position, the trunk axis forming an angle with a stander base central horizontal plane that is less than 90 degrees in the supine standing position and greater than 90 degrees in the prone standing position.

12. The complex rehabilitation technology system of claim 7, wherein the trunk support comprises a supine trunk support that is removably coupled to the stander base, and wherein the first foot support includes a first heel support that is configured to move about the first foot support to a supine foot support position associated with the supine trunk support and the second foot support includes a second heel support that is configured to move about the second leg support to the supine foot support position associated with the supine trunk support.

13. The complex rehabilitation technology system of claim 7, wherein the trunk support comprises a prone trunk support that is removably coupled to the stander base, and wherein the first foot support includes a first heel support that is configured to move about the first foot support to a prone foot support position associated with the prone trunk support and the second foot support includes a second heel support that is configured to move about the second foot support to the prone foot support position associated with the prone trunk support.

14. The complex rehabilitation technology system of claim 7, wherein each of the first and second leg supports comprise incremental adjustment markers configured to facilitate positioning of the first and second knee supports and of the first and second foot supports.

15. The complex rehabilitation technology system of claim 1, wherein the (Original) frame comprises a handle that facilitates one-handed carrying of the complex rehabilitation technology system.

16. The complex rehabilitation technology system of claim 1, wherein the frame and the complex rehabilitation technology device are separable into multiple components when in the collapsed carriable position.

17. The complex rehabilitation technology system of claim 1, further comprising a platform configured to support the frame when in the expanded support position, the platform including a plurality of casters configured to permit the platform to roll.

18. The complex rehabilitation technology system of claim 17, wherein the platform further comprises one or more slots for removably receiving and supporting the lower end portion of one or more of the first leg, the second leg, and the third leg.

19. The complex rehabilitation technology system of claim 1, wherein:

the first leg includes a first angled section and a first horizontal section, the second leg includes a second angled section and a second horizontal section, the third leg includes a lower portion, and wherein the frame further comprises:

a cross-support coupled to the lower portion of the third leg, the cross-support including a first end portion and an opposing second end portion, and first, second, third, and fourth casters, the first caster being coupled to the first leg, the second caster being coupled to the second leg, the third caster being coupled to the first end portion of the cross-support, and the fourth caster being coupled to the second end portion of the cross-support.

20. The complex rehabilitation technology system of claim 19, wherein:

the first leg further includes a first caster connector, with the first caster being coupled to the first caster connector, the second leg further includes a second caster connector, with the second caster being coupled to the second caster connector, and the cross-support includes a third caster connector on the first end portion and a fourth caster connector on the second end portion, with the third caster being coupled to the third caster connector, and the fourth caster being coupled to the fourth caster connector.

21. A portable stander system comprising:

a frame that includes a handle, the frame being movable between a collapsed carriable position and an expanded support position, the frame comprising a tripod, the tripod comprising:

a tripod base;

a first leg having an upper end portion and a lower end portion, the first leg hingedly attached to the tripod base at the upper end portion of the first leg via a first hinged connection;

a second leg having an upper end portion and a lower end portion, the second leg hingedly attached to the tripod base at the upper end portion of the second leg via a second hinged connection;

a third leg having an upper end portion and a lower end portion, the third leg hingedly attached to the tripod base at the upper end portion of the third leg via a third hinged connection; and a brace coupling the lower end portions of each of the first leg, the second leg, and the third leg, the brace being configured to expand and collapse with the tripod, the brace being further configured to support the tripod when the frame is in the expanded support position, wherein each of the first leg, the second leg, and the third leg are individually movable relative to the tripod base; and a stander device coupled to the frame, the stander device comprising a stander base coupled to the frame, the stander base configured to hold one or more leg supports, one or more knee supports, and one or more foot supports, wherein the portable stander system is configured for one-handed carrying via the handle.

22. The portable stander system of claim 21, wherein the stander device is configured for one-handed carrying via the handle when the frame is in the collapsed carriable position, and wherein the stander device is configured to be operable when the frame is in the expanded support position.

23. The portable stander system of claim 21, wherein the frame is collapsible to fit the frame within an interior volume of a package of 100 liters.

24. The portable stander system of claim 21, wherein the stander device further comprises:

a supine trunk support that is removably couplable to the stander base; and a prone trunk support that is removably couplable to the stander base.

* * * * *